United States Patent
Manes et al.

(10) Patent No.: US 10,156,683 B2
(45) Date of Patent: Dec. 18, 2018

(54) POLARITY IDENTIFICATION FOR POLARITY REVERSING DUPLEX UNIBODY CONNECTORS

(71) Applicant: Leviton Manufacturing Co., Inc., Melville, NY (US)

(72) Inventors: Dennis Manes, Mill Creek, WA (US); Evan Gustafson, Seattle, WA (US); Scott Hopper, Snohomish, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/381,071

(22) Filed: Dec. 15, 2016

(65) Prior Publication Data

US 2017/0293088 A1 Oct. 12, 2017

Related U.S. Application Data

(63) Continuation-in-part of application No. 15/260,305, filed on Sep. 8, 2016, now Pat. No. 9,946,035.
(Continued)

(51) Int. Cl.
*G02B 6/38* (2006.01)
(52) U.S. Cl.
CPC ......... *G02B 6/3831* (2013.01); *G02B 6/3825* (2013.01); *G02B 6/3885* (2013.01)
(58) Field of Classification Search
CPC ... G02B 6/3831; G02B 6/3825; G02B 6/3885
(Continued)

(56) References Cited

U.S. PATENT DOCUMENTS

| 4,611,887 A | 9/1986 | Glover et al. |
| 5,123,071 A | 6/1992 | Mulholland et al. |

(Continued)

FOREIGN PATENT DOCUMENTS

| CN | 102749682 A | 10/2012 |
| CN | 102749683 A | 10/2012 |

(Continued)

OTHER PUBLICATIONS

Office Action dated Oct. 5, 2017 for U.S. Appl. No. 15/481,039, 25 pages.
(Continued)

*Primary Examiner* — Jerry Blevins
(74) *Attorney, Agent, or Firm* — Amin, Turocy & Watson, LLP

(57) ABSTRACT

A fiber optic connector assembly incorporates features that improve structural rigidity and the integrity of transmitted signals. These features also facilitate a technique for reversing polarity of the connector assembly with little or no risk of twisting the optical fibers and without requiring the housing assembly to be disassembled. The connector is marked or embossed with transmit and receive connector labels that facilitate visual identification of the polarity of the connector. One side of the duplex connector can be marked with "A" and "B" labels corresponding to the receive and transmit connectors, respectively. The opposite side of the duplex connector can be marked with two "A" labels corresponding to the receive and transmit connectors, respectively. Thus, a user can readily identify whether the connector is configured for "A-B" polarity or "A-A" polarity.

20 Claims, 39 Drawing Sheets

Related U.S. Application Data

(60) Provisional application No. 62/321,145, filed on Apr. 11, 2016.

(58) Field of Classification Search
USPC .......................................................... 385/78
See application file for complete search history.

(56) References Cited

U.S. PATENT DOCUMENTS

| | | |
|---|---|---|
| 5,293,581 A | 3/1994 | DiMarco |
| 5,528,712 A | 6/1996 | Belenkiy et al. |
| 5,579,425 A | 11/1996 | Lampert et al. |
| 5,727,101 A | 3/1998 | Glebel et al. |
| 6,250,817 B1 | 6/2001 | Lampert et al. |
| 6,357,934 B1 | 3/2002 | Driscoll et al. |
| 6,409,392 B1 | 6/2002 | Lampert et al. |
| 6,435,732 B1 | 8/2002 | Asao et al. |
| 6,511,230 B1 | 1/2003 | Connelly et al. |
| 6,672,898 B2 | 1/2004 | Kahle et al. |
| 6,744,939 B2 | 6/2004 | Lampert et al. |
| 6,918,704 B2 | 7/2005 | Marrs et al. |
| 7,178,990 B2 | 2/2007 | Caveney et al. |
| 7,189,008 B2 | 3/2007 | Dye |
| 7,712,970 B1 | 5/2010 | Lee |
| 8,152,385 B2 | 4/2012 | De Jong et al. |
| 8,636,424 B2 | 1/2014 | Kuffel et al. |
| 8,678,669 B2 | 3/2014 | Lee |
| 8,727,638 B2 | 5/2014 | Lee et al. |
| 8,764,308 B2 | 7/2014 | Irwin |
| 8,801,301 B2 | 8/2014 | Bradley et al. |
| 9,063,303 B2 | 6/2015 | Irwin et al. |
| 9,207,410 B2 | 12/2015 | Lee et al. |
| 9,316,803 B2 | 4/2016 | Manes |
| 9,557,495 B2 | 1/2017 | Raven et al. |
| 9,625,658 B1 | 4/2017 | Lin |
| 2007/0047877 A1 | 3/2007 | Pepe |
| 2010/0220961 A1* | 9/2010 | de Jong ............... G02B 6/3879 385/77 |
| 2012/0099822 A1 | 4/2012 | Kuffel et al. |
| 2012/0308183 A1 | 12/2012 | Irwin et al. |
| 2014/0050443 A1 | 2/2014 | Lee |
| 2014/0169727 A1 | 6/2014 | Veatch et al. |
| 2014/0270636 A1 | 9/2014 | Manes |
| 2015/0277059 A1 | 10/2015 | Raven et al. |

FOREIGN PATENT DOCUMENTS

| | | |
|---|---|---|
| CN | 103091793 A | 5/2013 |
| CN | 102749683 B | 11/2014 |
| CN | 102749682 B | 5/2015 |
| TW | M474924924 | 3/2014 |
| WO | 2010099141 A1 | 9/2010 |
| WO | 2015103783 A1 | 7/2015 |

OTHER PUBLICATIONS

International Search Report for PCT Application No. PCT/US2016/055876, dated Jan. 25, 2017, 10 pages.
Written Opinion of the International Searching Authority for PCT Application No. PCT/US2016/055876, dated Jan. 25, 2017, 7 pages.
International Search Report for PCT Application No. PCT/US2017/020150, dated Jun. 15, 2017, 5 pages.
Written Opinion of the International Searching Authority for PCT Application No. PCT/US2017/020150, dated Jun. 15, 2017, 6 pages.
International Search Report for PCT Application No. PCT/US2017/026486, dated Jul. 26, 2017, 3 pages.
Written Opinion of the International Searching Authority for PCT Application No. PCT/US2017/026486, dated Jul. 26, 2017, 5 pages.
Office Action dated Jun. 30, 2017 for U.S. Appl. No. 15/260,305, 20 pages.

* cited by examiner

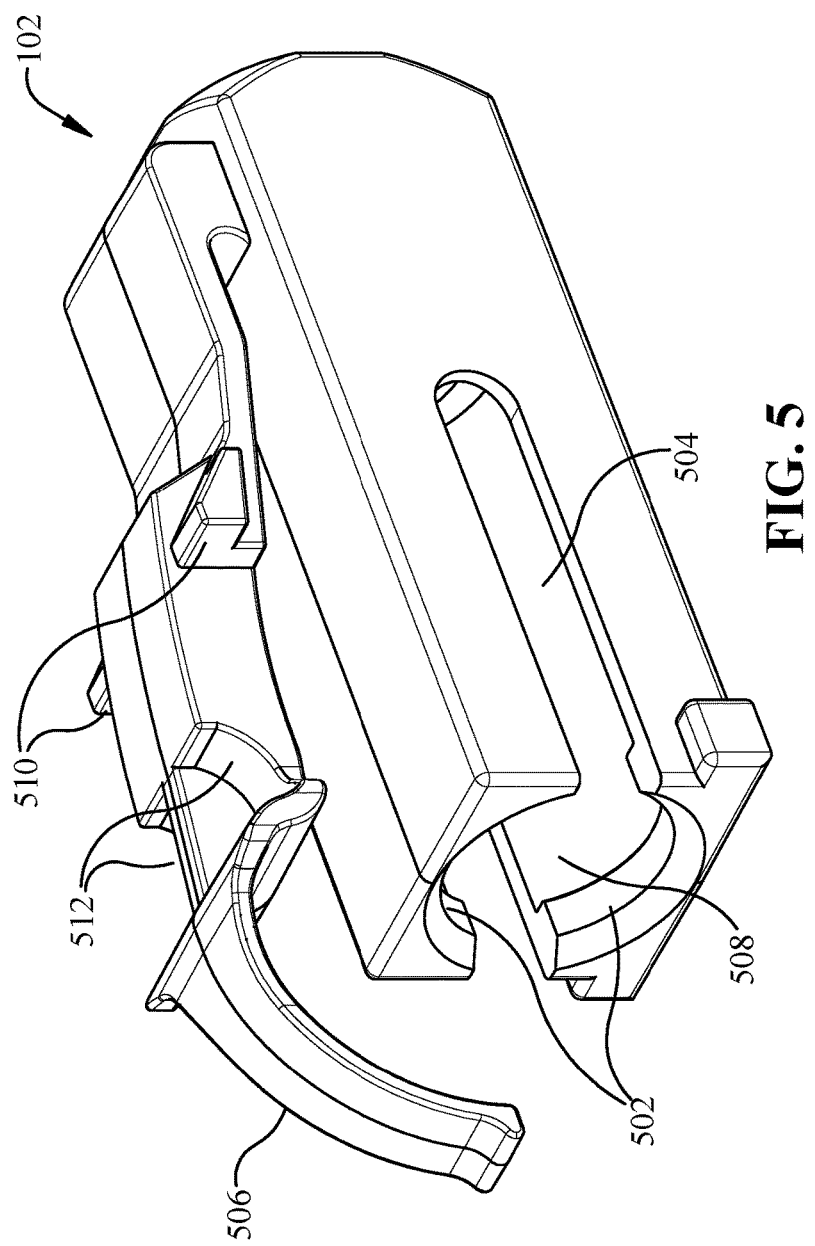

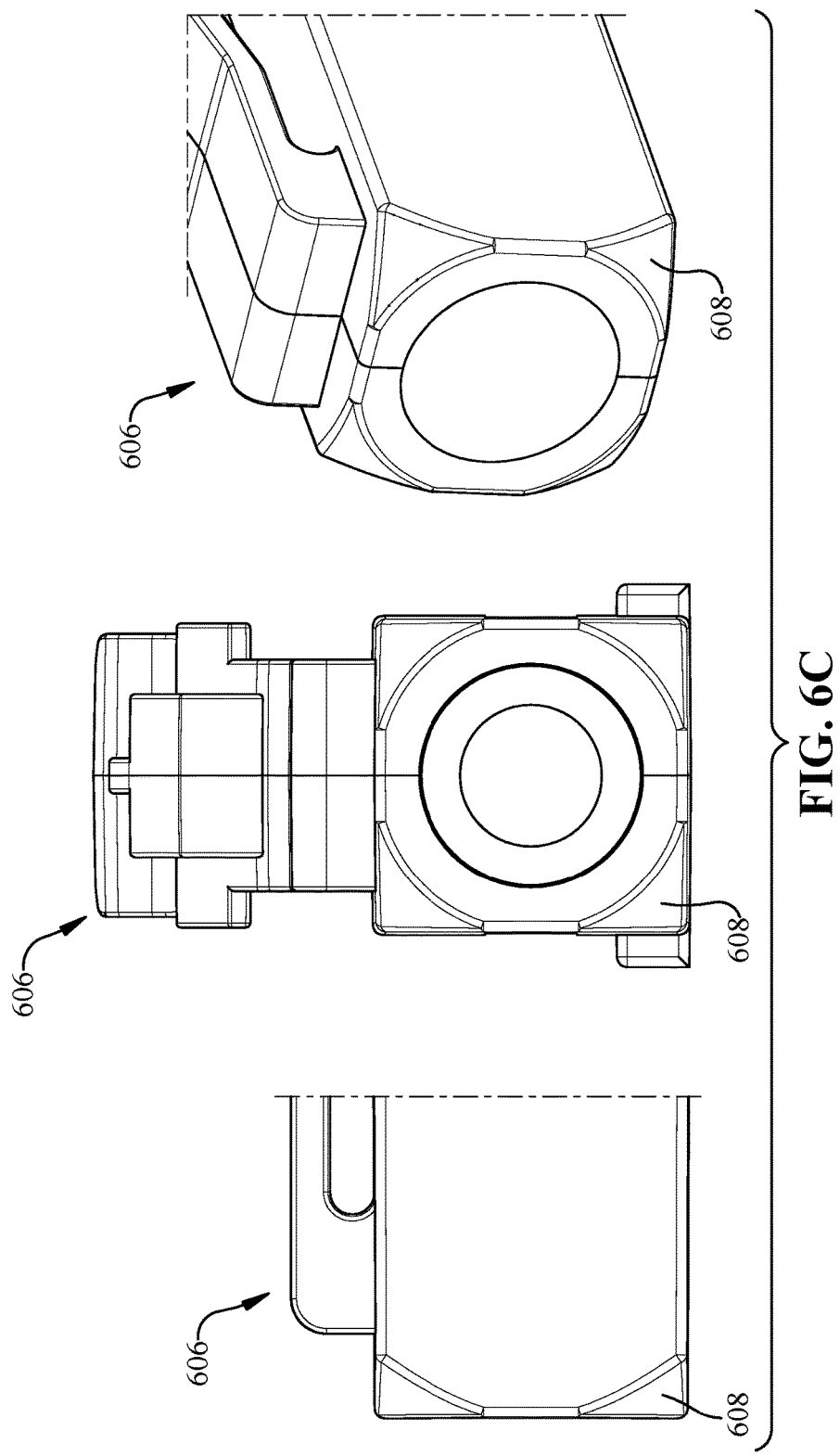

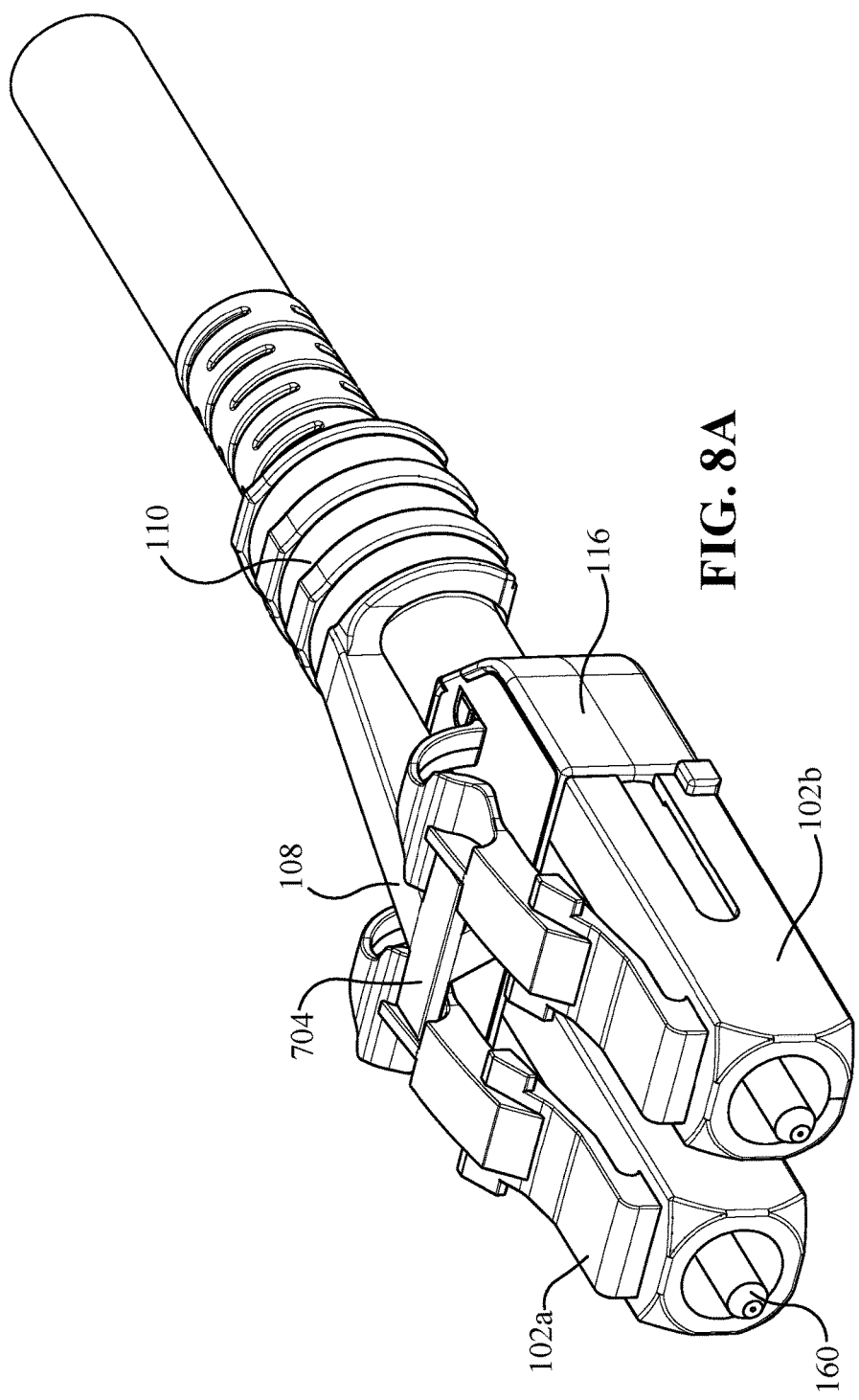

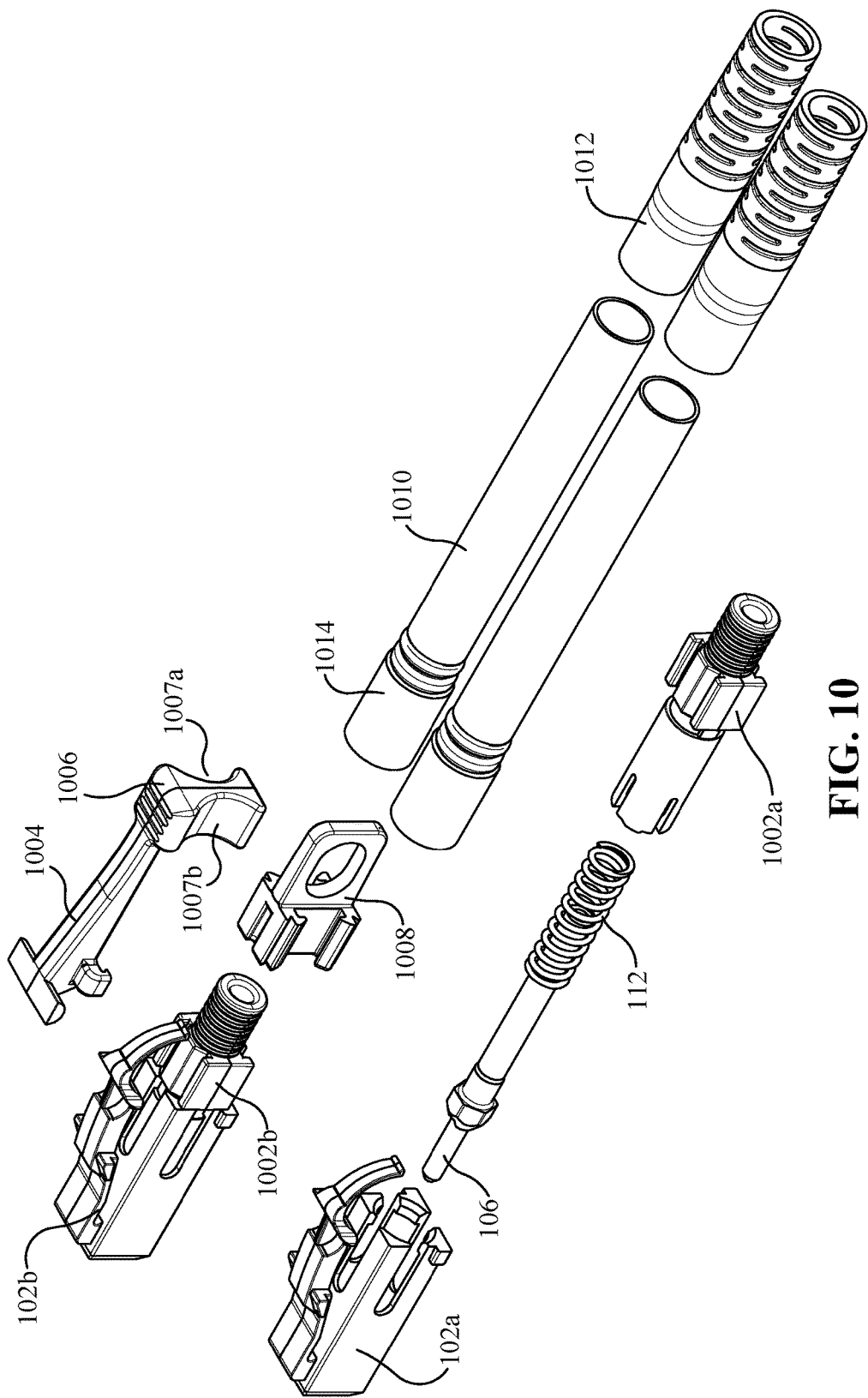

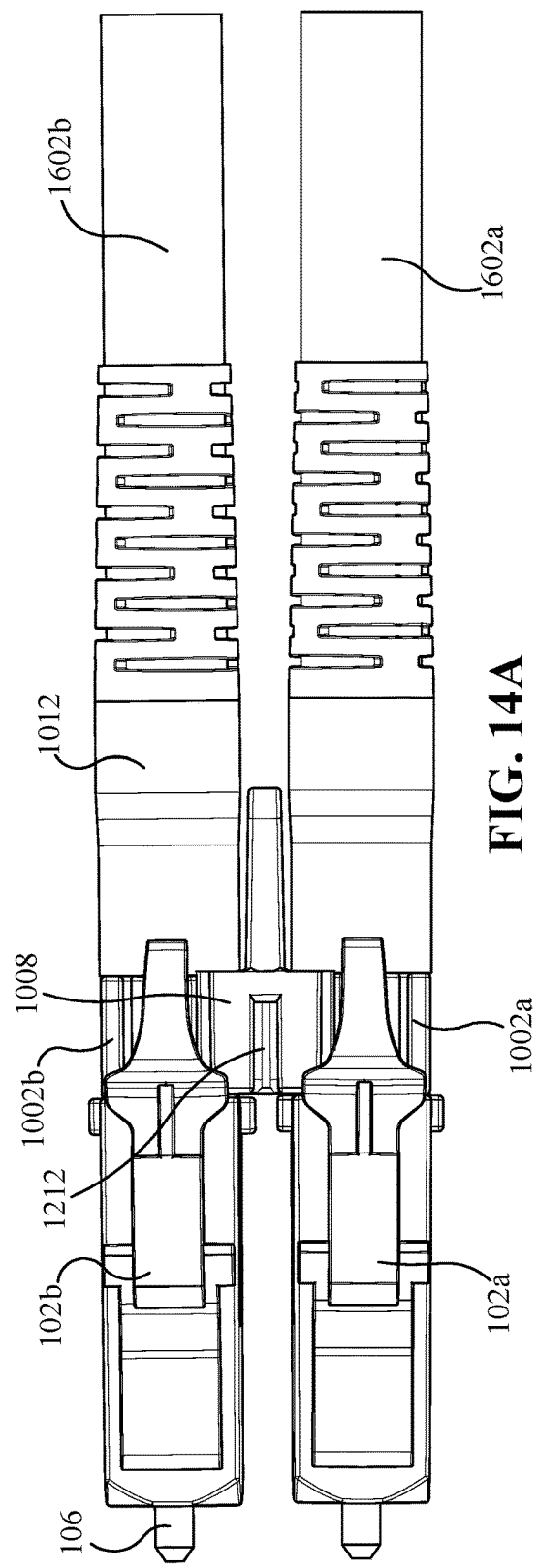

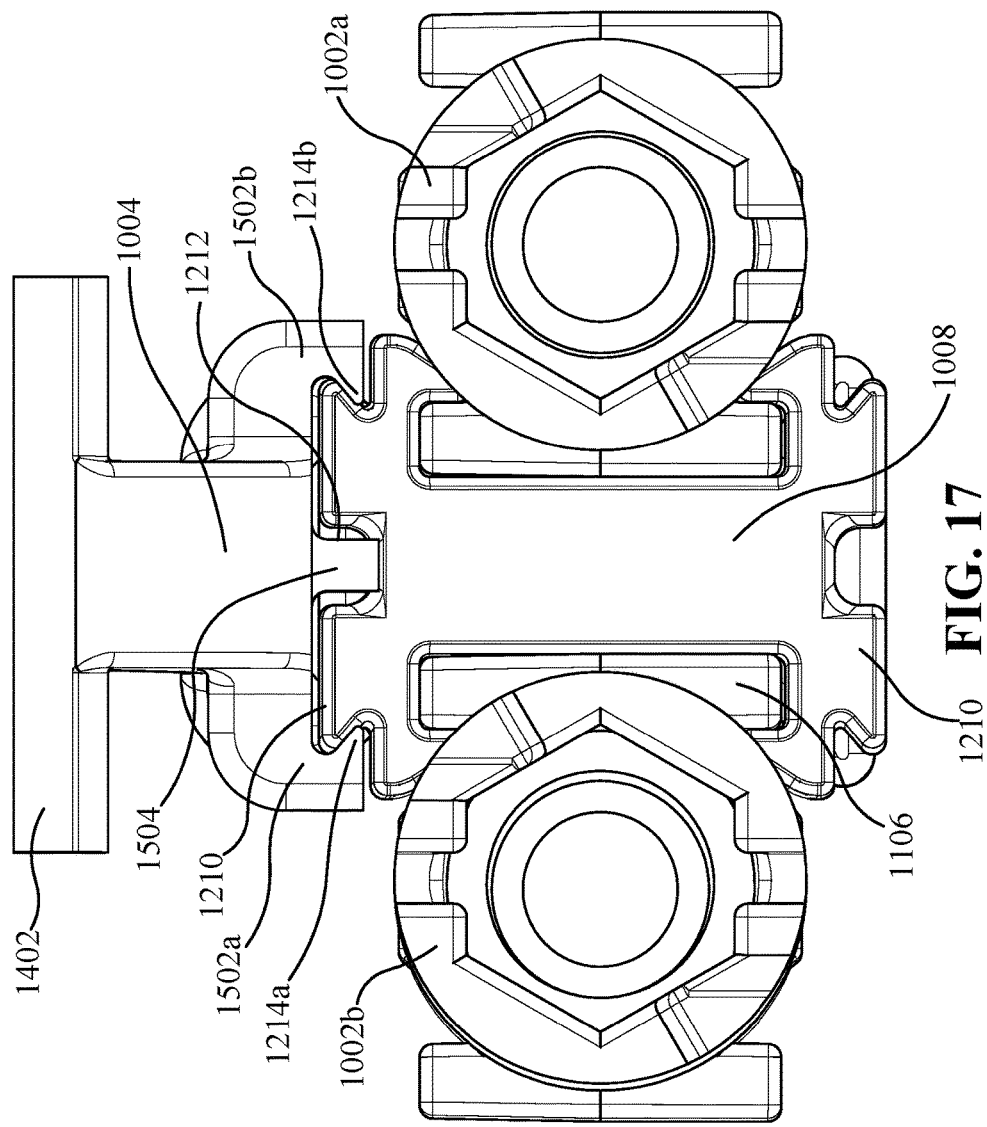

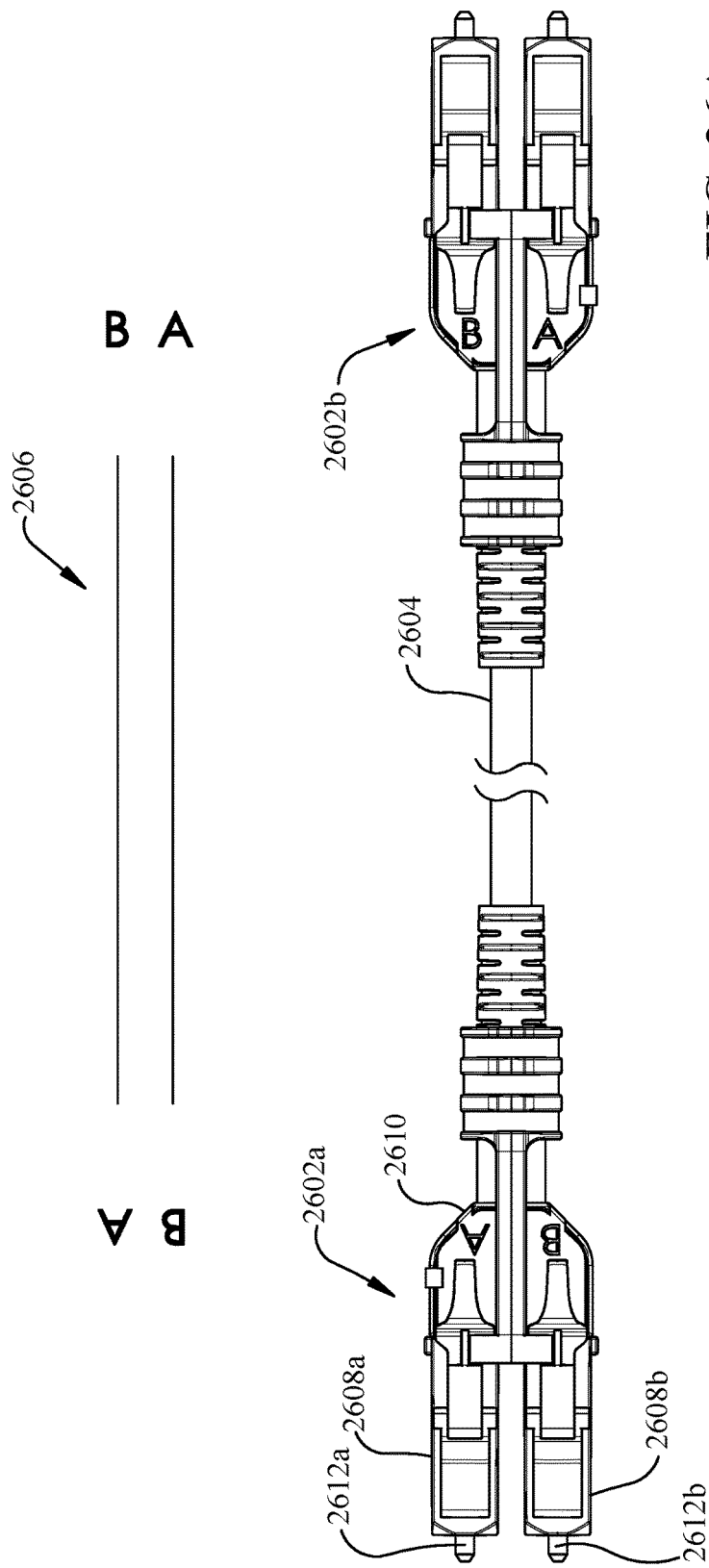

POLARITY IDENTIFICATION FOR POLARITY REVERSING DUPLEX UNIBODY CONNECTORS

CROSS-REFERENCE TO RELATED APPLICATIONS

This application is a continuation-in-part of, and claims priority to each of, U.S. patent application Ser. No. 15/260,305, filed on Sep. 8, 2016 and entitled "FIBER OPTIC CONNECTOR," which application claims priority to U.S. Provisional Patent Application Ser. No. 62/321,145, filed on Apr. 11, 2016, and entitled "DUPLEX FIBER OPTIC COMPONENTS SUITABLE FOR POLARITY REVERSAL," the entireties of each of which applications are hereby incorporated herein by reference.

TECHNICAL FIELD

The disclosed subject matter relates generally to data cabling, and, in particular, to fiber optic connectors

BACKGROUND

Many fiber optic systems employ LC fiber optic connectors for termination and connectivity of fiber optic cables. The small form factor of these LC connectors allows a large number of fiber optic cables to be connected in high density arrays, such as those found in fiber optic patch panels used in data centers. Duplexed LC connectors together house two optical fibers each of which is terminated on a respective ferrule that protrude from the front of the duplexed connectors, thereby providing termination and connectivity for a transmit fiber and a receive fiber.

The small form factor of the LC connector—whether used as a single connector ("simplex") or as a duplexed pair—affords a number of advantages, particularly in high density environment. There are, however, a number of functional and perceptual issues inherent in conventional LC connector designs.

For example, when used in congested environments, such as fiber optic patch panels, the minimal spacing between adjacent LC connectors makes it difficult to both insert the LC connector into, and disconnect it from, its corresponding port in an adapter or module disposed in a patch panel.

Also, reversing the polarity in the field of patch cables pre-terminated to duplexed LC connectors can be a cumbersome task, requiring the duplexed LC connector assembly to be disassembled and the terminated ferrules within the assembly to be physically swapped before reassembling the assembly. In addition to requiring mechanical disassembly and reassembly of the duplexed LC connector assembly, polarity reversal of duplexed LC connectors creates a risk of tangling or twisting the optical fibers when the ferrules are swapped, potentially damaging the fibers. Also, in some cases, users cannot easily identify the current polarity configuration for a given patch cable without unplugging and disassembling the connector. Moreover, the small form factor, coupled with the relatively large number of interconnected components that often make up these duplexed LC connectors, gives rise to a perception that these connectors lack sufficient rigidity and durability to withstand repeated connection to, and disconnection from, patch panels or other devices.

The above-described deficiencies of current LC connectors are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to an improved fiber optic connector design that provides a number of advantages over current LC connector designs. Embodiments of the fiber optic connector described herein incorporate features that facilitate easy access to selected fiber cable connectors within high density environments, while maintaining a form factor having a low profile conducive to such high density applications. The fiber optic connector assemblies described herein employ a relatively small number of component parts, yielding a rigid and reliable construction while lowering manufacturing costs relative to connector designs requiring a larger number of components. Unique barrel features used in both duplex and paired simplex versions of the connector assembly facilitate fast and easy polarity reversal with little or no risk of twisting or damaging optical fibers in the process. A long-tail puller component can also be added to the connector assembly to provide ready access to the connector within congested installations. The connector maintains a low profile that reduces the risk of catching on adjacent cables or enclosure edges when pulled through congested fiber paths.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent, from the following detailed description when considered in conjunction with the drawings. It will also be appreciated that the detailed description may include additional or alternative embodiments beyond those described in this summary.

BRIEF DESCRIPTION OF DRAWINGS

FIG. 5 is an orthographic view of an example front body of a fiber optic connector.

FIG. 6C is a side view, a front view, and an orthogonal view of an example front body of a fiber optic connector having chamfered or rounded corners on its front face.

FIG. 8A is an orthogonal view of an assembled fiber optic connector with unibody housing including a puller.

FIG. 10 is an orthographic view of the components of an example paired simplex fiber optic connector with duplex clip.

FIG. 14A is a top view of an assembled paired simplex connector with a duplex clip.

FIG. 17 is a front view of a paired simplex connector with a duplex clip including a puller with the front bodies removed.

FIG. 26A is a top view of a fiber optic cable terminated on both ends by a first duplex connector and a second duplex connector.

DETAILED DESCRIPTION

Figure 1:
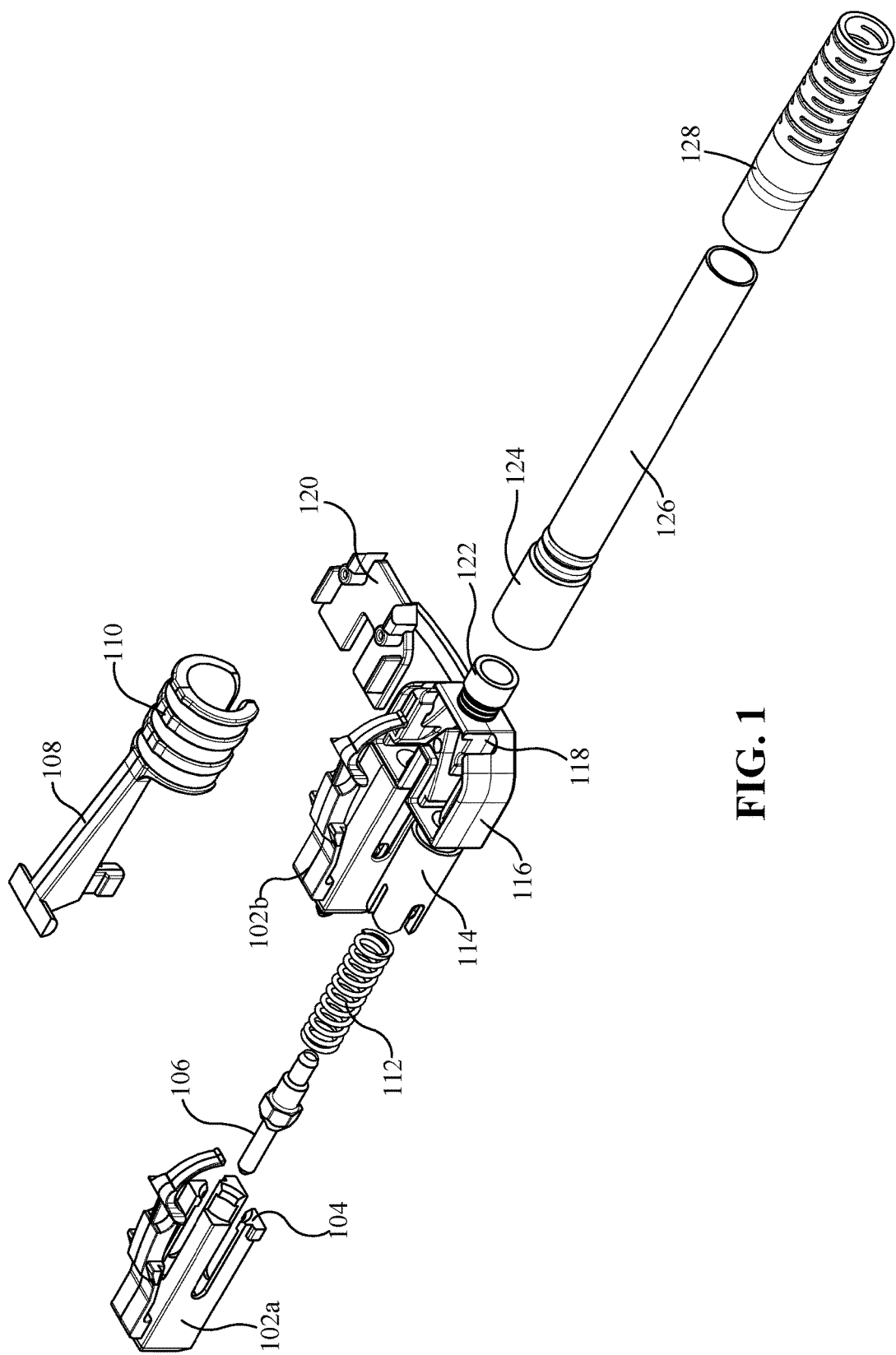
FIG. 1 is an orthographic view of the components of an example duplex fiber optic connector with unibody housing.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As will be described in more detail below, certain features of the fiber optic connector design described herein can be embodied in a duplex type connector for use with duplex fiber optic cables (e.g., round duplex or other types of duplex cables) as well as in a paired simplex connector assembly that allows two simplex connectors to be clipped together to yield a sturdy duplex type connector. Both types of assemblies are described in detail below.

FIG. 1 is an orthographic view of the components of an example duplex LC connector assembly according to one or more embodiments of this disclosure. The components of the duplexed LC connector assembly are separated in FIG. 1 to provide a view of the individual components and their relationships to one another.

Figure 2:
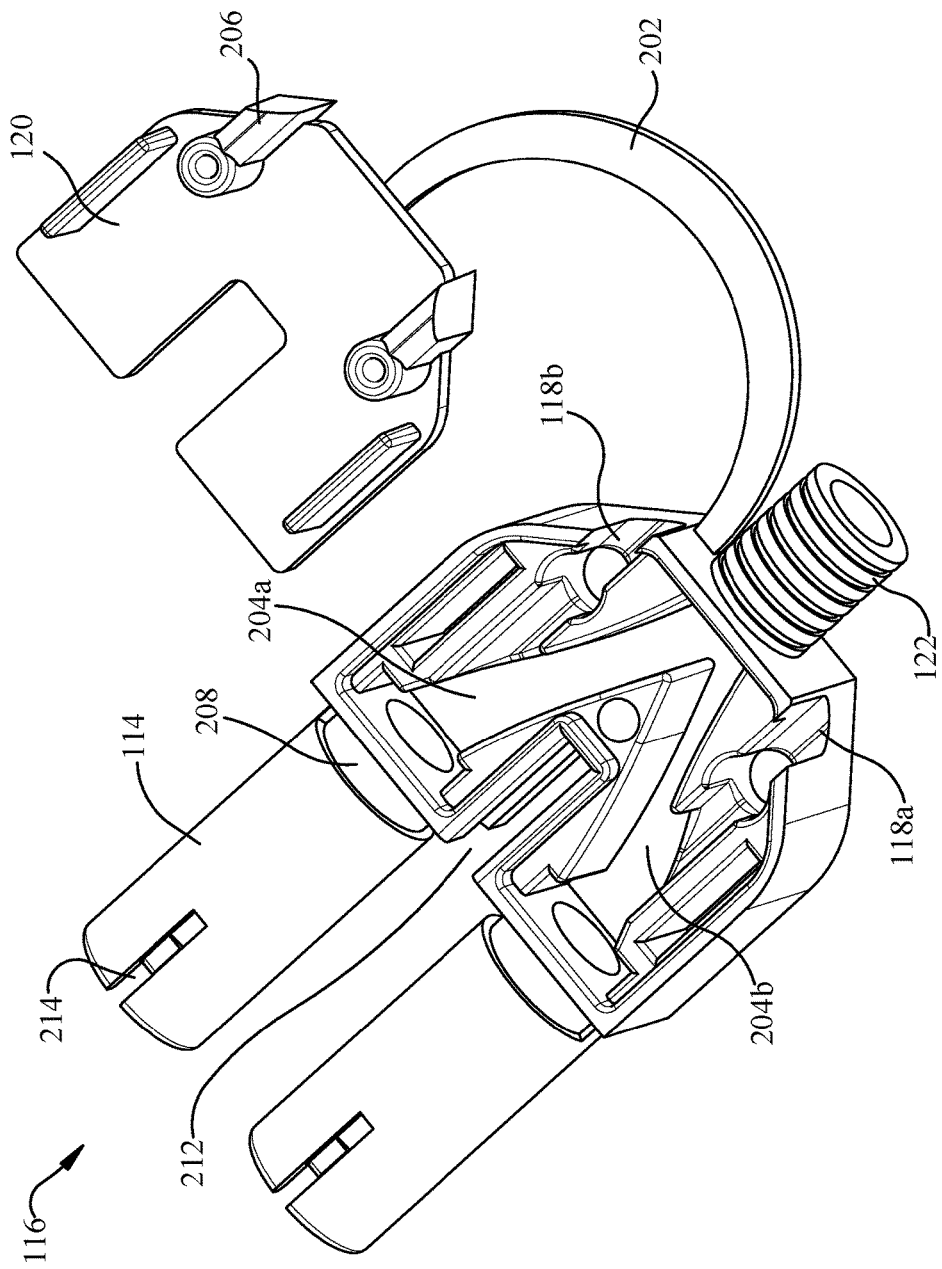
FIG. 2 is a detailed view of a unibody housing.

The duplexed LC connector assembly includes a unibody housing 116 having two hollow barrel projections 114 on its front side (note that only one barrel projection 114 is visible in FIG. 1, since the second barrel projection is concealed by front body 102b installed thereon). FIG. 2 is a detailed view of the unibody housing 116. The barrel projections 114 are hollow through their respective lengths, each providing a passage from the inner chamber of the unibody housing 116 to the outside of the connector. A step or groove 208 is formed around the base of each barrel projection 114. In various embodiments, this groove may completely traverse the circumference of the barrel projection 114, or may traverse a portion of the circumference. These grooves 208 are used to affix front bodies 102 on the barrel projections 114 in a rotatable manner, as will be described in more detail below.

Figure 3:
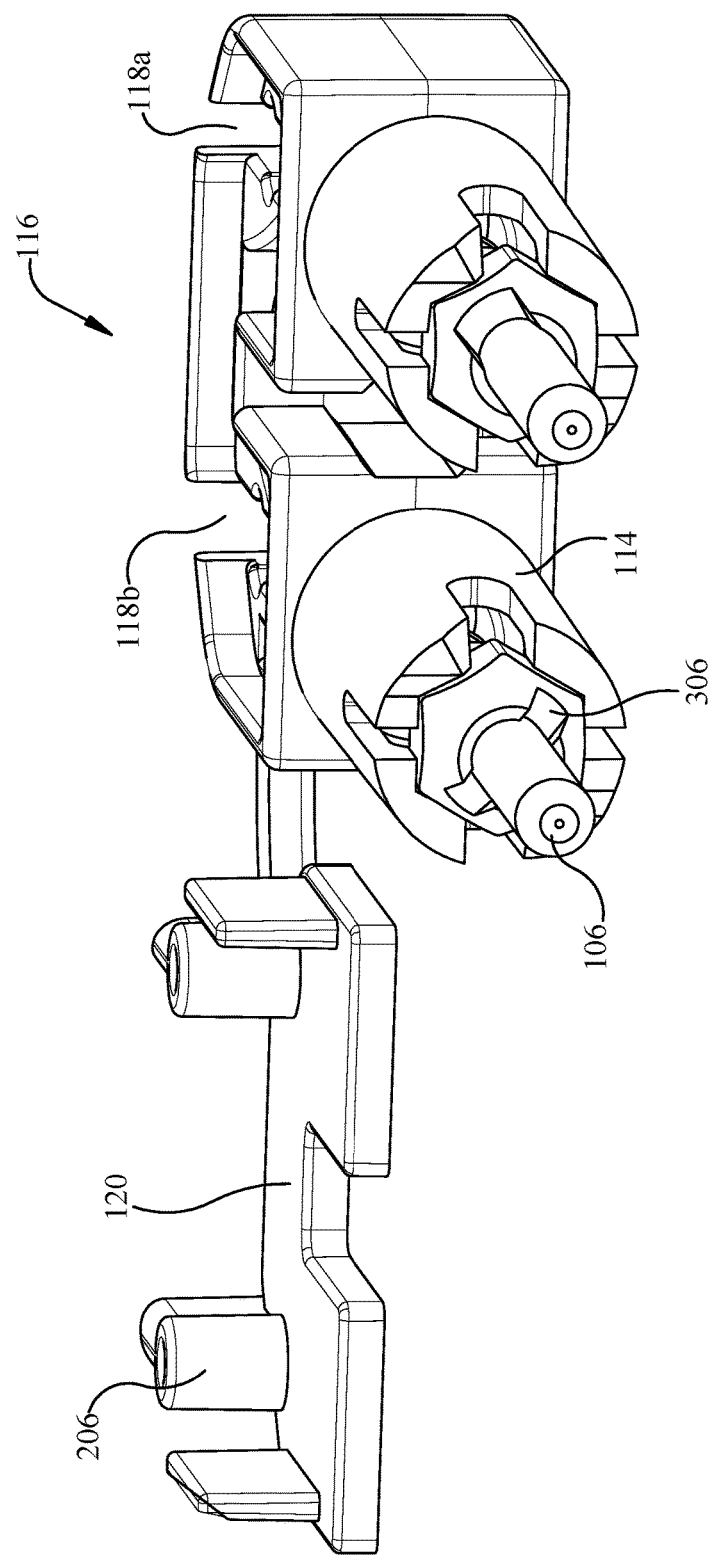
FIG. 3 is an orthographic front view of an example unibody housing with ferrule assemblies installed in respective barrel projections.

A coil spring 112 and corresponding ferrule assembly 106 is installed through the front opening of each barrel projection 114, such that a rear tip of the ferrule assembly 106 resides within the coil of the spring 112, thereby spring-loading the ferrule assembly 106. To facilitate installation of the ferrule assembly, cuts 214 may be formed along the front portion of each barrel projection 114, extending from the front opening of the barrel projection to a point along its length, to allow a degree of expansion while installing the ferrule assembly, FIG. 3 is an orthographic front view of an example embodiment of the unibody housing 116 with the ferrule assemblies 106 installed in the respective barrel projections 114. In this example embodiment, the inner surface of the front opening of each barrel projection 114 comprises a number of flat surfaces arranged to form a hexagonal profile designed to mate with the hexagonal shape of the ferrule holder 306 of ferrule assembly 106. Thus, when the ferrule assembly 106 is installed in the barrel projection 114, the flat inner surfaces of the barrel opening and the corresponding surfaces of ferrule holder 306 prevent the ferrule assembly 106 (and the optical fibers connected thereto) from twisting inside the unibody housing 116. Although the profile of the barrel projection's inner surface is depicted as being hexagonal in FIG. 3, it is to be appreciated that any suitable geometric shape can be used as the basis for the front opening of the barrel projections 114 without departing from the scope of one or more embodiments of this disclosure The unibody housing 116 also includes a crimp core 122 on its rear side that provides a rear opening into the unibody housing 116, as can be seen more clearly in FIG. 4, which is a detailed rear view of the unibody housing 116. Two optical fibers of a duplex fiber cable can enter the inner chamber of the unibody housing 116 through this rear opening. As can be seen in FIG. 2, two fiber passages 204a and 204b are formed in the inner chamber of unibody housing 116, each of the two fiber passages 204a and 204b leading from the rear opening (crimp core 122) to one of the barrel projections. The two optical fibers that enter the unibody housing 116 via crimp core 122 are routed through these two fiber passages 204 one fiber per passage—one fiber per passage—and connected to the rear ferrule connector of ferrule assembly 106, thereby providing a signal connection between the ferrules and their corresponding optical fibers.

Figure 4:
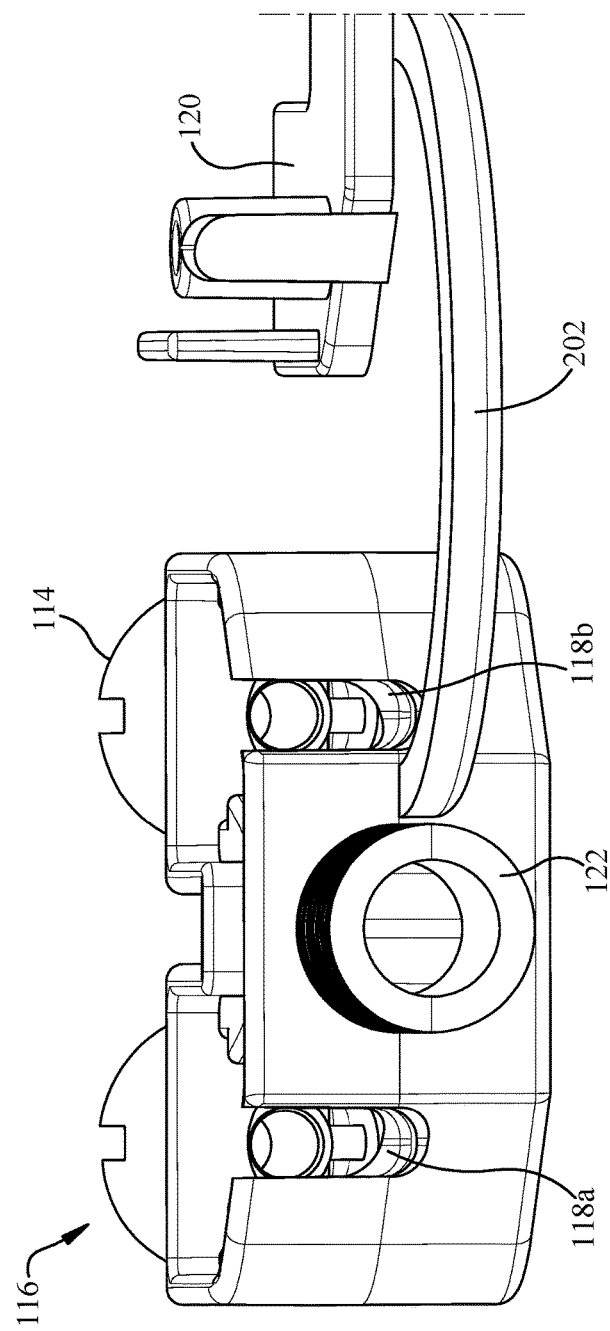
FIG. 4 is a detailed rear view of a unibody housing of a fiber optic connector.

To provide manufacturers with direct access to the rear ends of ferrule assemblies 106 for injection of adhesive to connect the optical cables to the ferrule assemblies, some embodiments of unibody housing 116 can include two adhesive needle channels 118a and 118b located on the rear side of the unibody housing opposite the two barrel projections 114, as can be seen in FIGS. 2 and 4. These adhesive needle channels 118 serve as passage ways through which a manufacturer can insert an adhesive injection needle during fabrication of the connector in order to inject epoxy or other adhesive material on the joint between the fiber optic cable and the ferrule assembly 106. After these internal linkages have been made, lid 120—which is attached to the main unibody housing via strap 202 at this stage—can be affixed to the top of the unibody housing 116, thereby enclosing the fiber optic cables and rear ends of the ferrule assemblies 106 within the unibody housing. When the lid 120 is installed on the unibody housing 116, projections 206 on the inside surface of lid 120 are inserted into the adhesive needle channels 118, thereby closing the channels 118 and preventing debris from entering the unibody housing 116. Once this assembly is complete, the strap 202 can be removed by the manufacturer prior to distribution of the duplexed LC connector assembly.

Any suitable mechanism can be used to connect an incoming duplex fiber optic cable to crimp core 122. For example, FIG. 1 depicts an assembly comprising a crimp sleeve 124 and heat shrink tubing 126, which can act as a sheath for the incoming cable. The assembly can also include a tapered boot 128 that can be slid over heat shrink tubing 126 and the crimp sleeve 124 for additional protection.

After the spring 112 and ferrule assembly 106 have been installed in each barrel projection 114, the front bodies 102a and 102b are installed over the respective barrel projections 114 (note that FIG. 1 depicts front body 102b as being installed over its corresponding barrel projection, while front body 102a has been removed from its corresponding barrel projection 114 to provide a view of the component parts). Each front body 102 is hollow and comprises a front opening that is oriented such that, when the front body is fully installed on barrel projection 114, the forward spring force applied by the spring 112 causes the ferrule of ferrule assembly 106 to project through the front opening of the front body 102, while the remainder of the ferrule assembly 106 and the spring 112 are housed within the chamber formed by the front body 102 and the barrel projection 114. The ferrule assembly 106 is spring-loaded against the front body 102, such that the front body keeps the ferrule and spring contained within the hollow portion of the barrel projection 114 while the front body is mounted over the barrel projection.

FIG. 5 is an orthographic view of an example front body 102. Front body 102 mounts over a barrel projection 114 by sliding the rear of the front body 102 over the front of the barrel projection 114 such that the front of the barrel projection enters the rear opening 508 of front body 102. Cuts 504 are formed on the front body 102, traversing from the rear edge of the front body to a point along the length of the front body. These cuts 504 allow a degree of expandability when installing the front body 102 over the barrel projection 114. The example illustrated in FIG. 5 depicts only two cuts 504 on opposite left and right sides of the body, thereby splitting the rear opening 508 into two sections. However, some embodiments may also include only one cut, or may include third and fourth cuts 504 on the top and bottom sides of the front body 102, thereby yielding a design having more than two sections or fewer than two sections.

The inner rim of each section of rear opening 508 comprises a raised ridge 502 designed to reside in groove 208 of the barrel projection 114. Thus, when the front body 102 is fully installed on the barrel projection 114, the raised ridges 502 latch into groove 208 of the barrel projection 114, holding the front body 102 in place on the unibody housing 116. As will be described in more detail below, the interaction of these raised ridges 502 with groove 208 also facilitates rotation of the front body 102 about the barrel projection 114.

Front body 102 also includes an elastic latch 506 on its top surface that serves to latch the connector within an adapter when plugged into a patch panel or other device. When the connector is mated with an adapter, the upward spring force of the cantilevered latch 506 causes latching surfaces 510 on the latch to remain engaged with corresponding latching features on the adapter. Applying a downward pressure on the latch 506 causes the latching surfaces 510 to disengage from the latching features of the adapter, thereby allowing the connector to be removed. Latch 506 also includes two recessed areas 512 within which the t-bar of long-tail puller 108 (see FIG. 1) resides when the puller 108 is added to the duplexed LC connector assembly, as will be described in more detail below.

The design of the unibody housing 116 and front body 102 offers a number of advantages over conventional LC connector designs. For one, inclusion of the barrel projections 114 as formations on the unibody housing 116 over which the front bodies 102 are installed yields a connector design requiring fewer parts than are typically used for duplexed LC connector assemblies. For example, many LC connector designs require two front bodies that connect to respective rear bodies, which in turn are connected to a uniboot housing. By contrast, the unibody housing and front body designs described above eliminate the need for a rear body component, thereby lowering manufacturing costs by reducing part count. Moreover, eliminating the connective interface between the rear body and the uniboot housing found in conventional LC connectors can result in a more rigid connector structure, since imprecise connections between components often result in looseness or excessive wiggle between these components, which may adversely affect signal transmission. By mounting the front bodies over rigid barrel projections formed on the unibody housing described above, embodiments of the present design eliminate this looseness and yield a sturdier assembly for improved signal transmission. Also, as will be described in more detail below, the interaction of the front body 102 and the barrel projection 114 allows the front body to rotate about the barrel projection 114 independently of the ferrule assembly (that is, without causing a corresponding rotation of the ferrule assembly), which allows the polarity of the duplexed LC connector assembly to be easily reversed in the field with little or no risk of twisting or damaging the optical fibers inside the unibody housing 116, and without the need to open the connector housing. Since this polarity reversal feature is implemented in a connector design having a compact form factor, a puller 108 can also be mounted to the connector without expanding the duplexed LC connector assembly's size profile to a degree that interferes with adjacent connectors in high density connector installations.

Figure 6A:
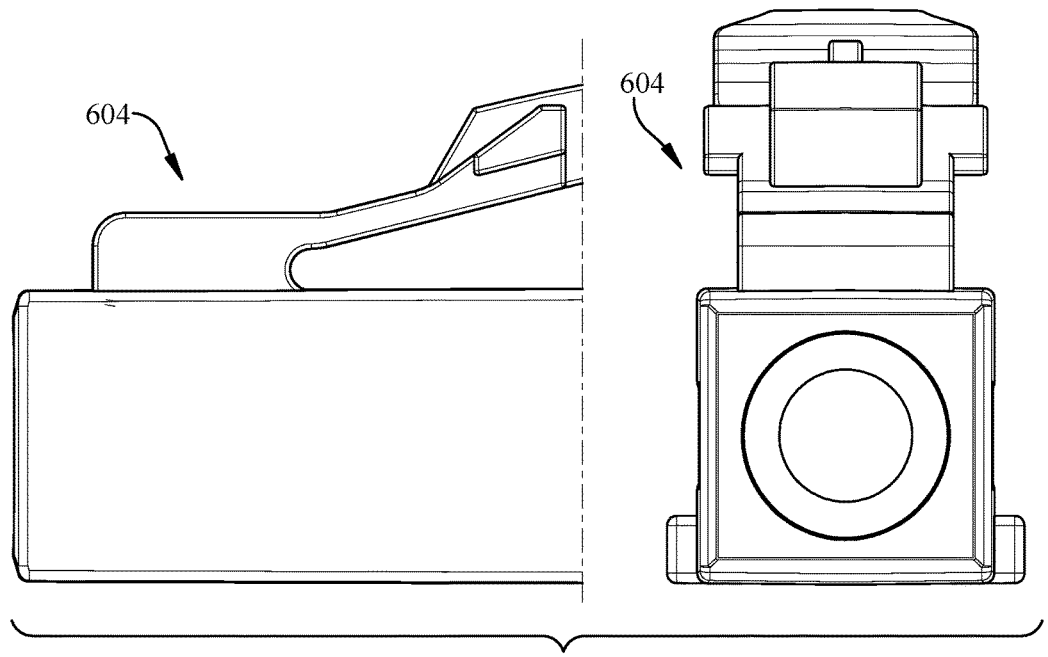
FIG. 6A is a side view and a front of a front body of a fiber optic connector housing having a substantially square profile.
Figure 6B:
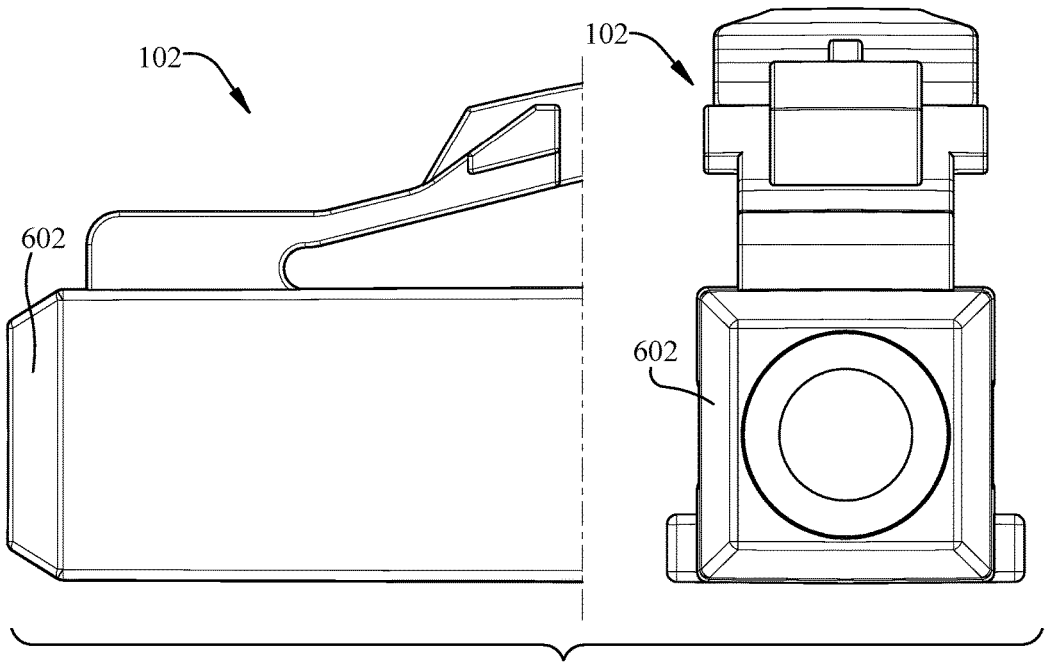
FIG. 6B is a side view and a front view of an example front housing of a fiber optic connector having a chamfered front face.

One or more embodiments of the front body 102 can include a number of other features that improve user experience. For example, the front edges of front body 102 can be chamfered to promote ease of insertion into a data port. For comparison, FIG. 6A depicts a side view and a front view of a front body 604 having a substantially square profile. FIG. 6B depicts a side and front view of an example front body 102 having a chamfered front face according to one or more embodiments of the present disclosure. As can be seen, the four edges of the front face are chamfered, resulting in angled surfaces 602 around the front opening of front body 102, in contrast to the squared edges of front body 604. This design affords the user a greater degree of alignment tolerance when inserting the connector into a square fiber optic adapter port, since the angled surfaces 602 allow room for error when aligning the front of the connector with the entrance of the adapter. This feature can be particularly useful when the user is attempting to plug the connector into a fiber optic adapter located outside the user's field of view e.g., an adapter located in the rear of a panel facing a wall, or that is obscured by other equipment), requiring the user to align the connector with the adapter purely by touch and with no visual guidance.

FIG. 6C depicts side, front, and orthogonal views of another example front body 606 having chamfered or rounded corners 608 on its front face. These chamfered corners 608 serve a similar function to the angled surfaces 602 of front body 102 using an alternative design that produces a more rounded front face.

Figure 7:
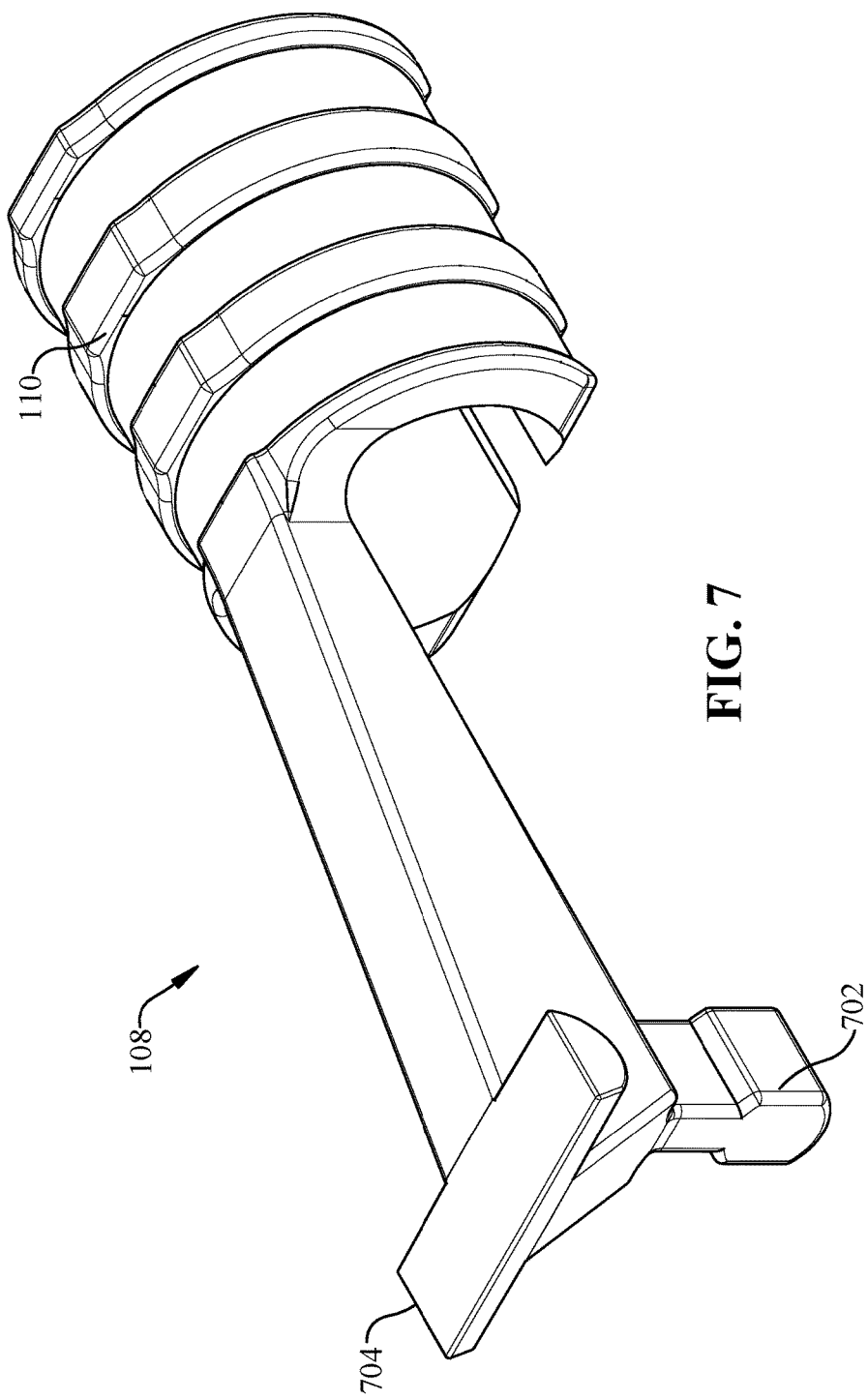
FIG. 7 is an orthogonal view of an example puller for a duplex fiber optic connector.

As noted above, a long-tail puller 108 (see FIG. 1) can be mounted to the connector assembly. FIG. 7 is an orthogonal view of an example puller 108 according to one or more embodiments. Puller 108 includes a sleeve 110 and a t-bar 704 connected together by an arm. Sleeve 110 has a cut along its bottom so that the sleeve can be slipped over the fiber optic cable and moved forward onto boot 128 and into position on the duplexed LC connector assembly. A protrusion 702 located below t-bar 704 is designed to insert into a corresponding recess 212 in unibody housing 116 (see FIG. 2). FIG. 8A is an orthogonal view of the assembled duplex fiber optic connector with unibody housing 116, including puller 108. Applying a pull force on the sleeve 110 of puller 108 can cause a least a portion of the pull force to be translated to the t-bar 704 residing in recessed areas 512 of the front body latches 506 (see FIG. 5), causing a substantially equal distribution of pull force between the two front bodies 102a, 102b and assisting in removal of the front bodies 102a, 102b from their corresponding ports in a duplex adapter. In this way, puller 108 can improve physical access to the duplexed LC connector assembly in high density installations to facilitate insertion and removal of the assembly from the adapter. The compact form factor of the puller 108 also prevents it from physically interfering with adjacent connectors in such environments. Moreover, the rear end sleeve 110 portion of the puller 108 includes no sharp features that could catch on cables or wires as the duplexed LC connector is being pulled through a congested environment.

Figure 8B:
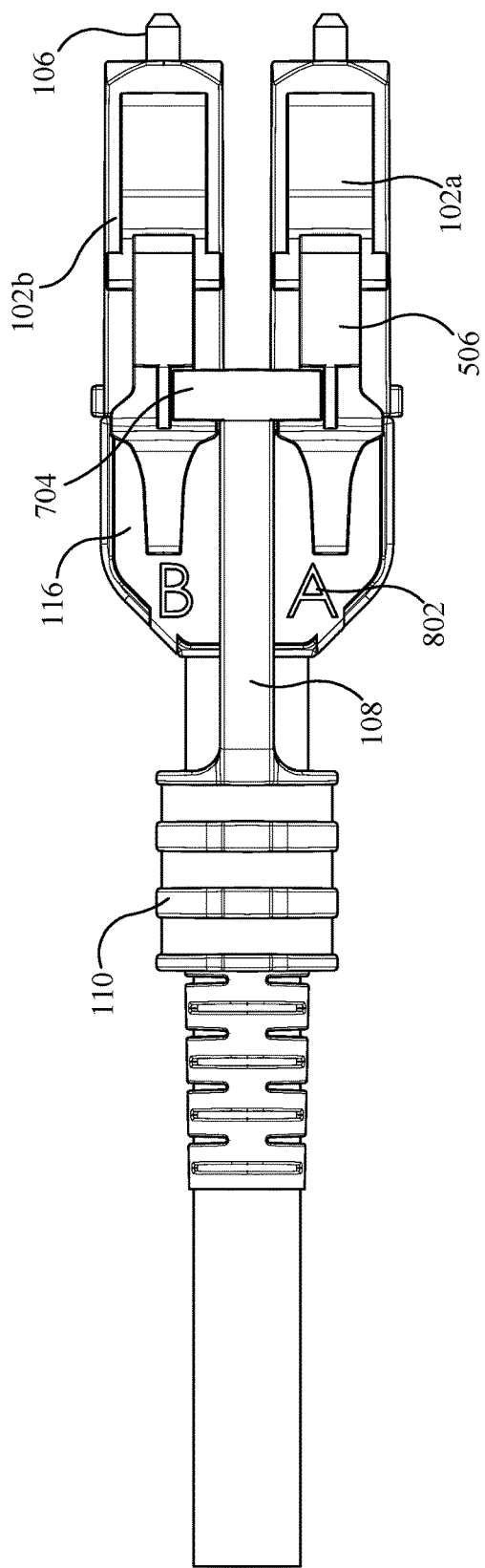
FIG. 8B is a top view of an assembled fiber optic connector with unibody housing including a puller.

FIG. 8B is a top view of the assembled duplex fiber optic connector. Note that the left and right sides of t-bar 704 reside within the recessed areas 512 formed in latches 506 of the front bodies 102 (see FIG. 5), ensuring that a pulling force applied to the puller 108 is distributed substantially equally to each side of t-bar 704 and thus equally to the two latches 506 of the duplexed LC connectors. Also, as can be seen in the view of FIG. 8B, one or more embodiments of the unibody housing 116 can be marked with identification markings 802 that distinguish between the top side and bottom side of the unibody housing 116, allowing users to easily identify whether the polarity of the optical fibers with the duplex patch cable terminated to the duplexed LC connectors has been reversed. This is described in more detail below in connection with the polarity reversal technique made possible by embodiments of the subject connector design.

Figure 9B:
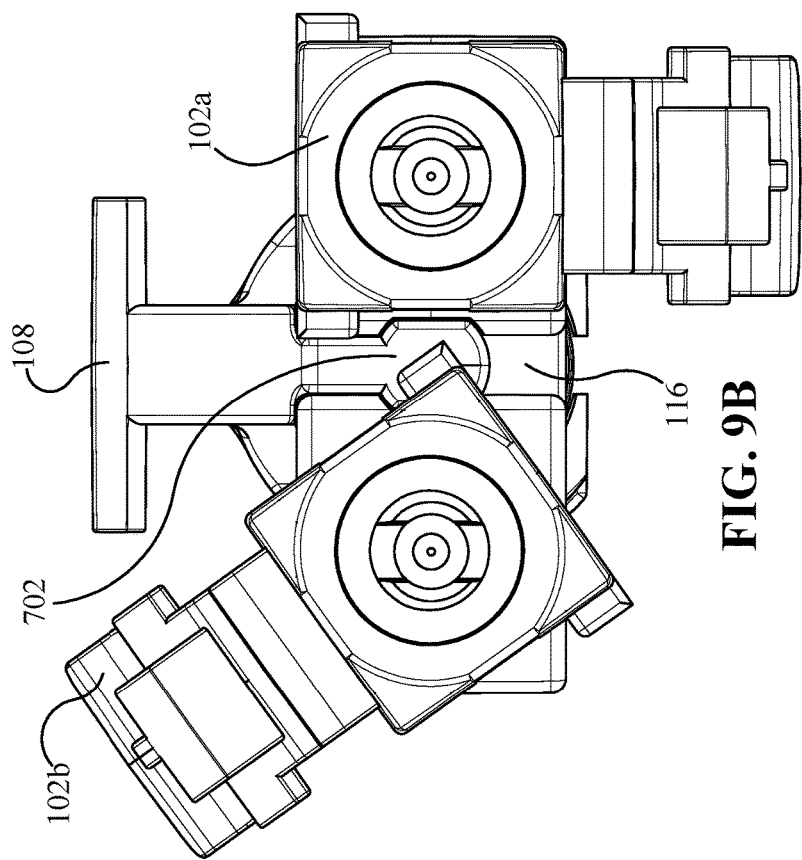
FIG. 9B is a front view of an assembled fiber optic connector with unibody housing depicting rotation of the front bodies.
Figure 9A:
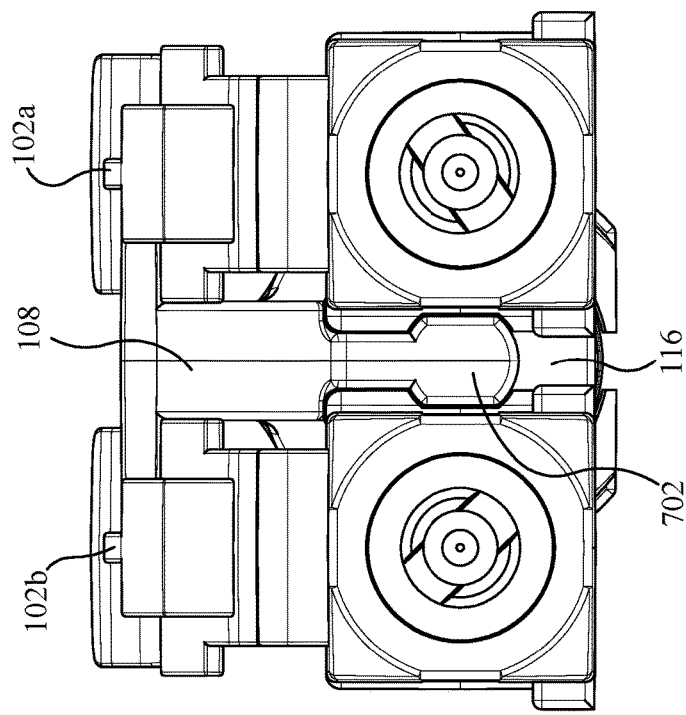
FIG. 9A is a front view of an assembled fiber optic connector with unibody housing.

FIG. 9A is a front view of the assembled duplex fiber optic connector. As can be seen more clearly in this view, protrusion 702 of puller 108 resides in a corresponding recess of the unibody housing 116 between the two fiber passages 204. As noted above, the physical relationships between the front bodies 102, the barrel projections 114 of unibody housing 116, and the ferrule assemblies 106 allow the front bodies 102a, 102b to be rotated about the unibody housing 116 independently of the ferrule assemblies 106, as illustrated in the front view of FIG. 9B. Which depicts front bodies 102a, 102b semi-transparently. In FIG. 9B, front body 102a is depicted as having been rotated 180 degrees, while front body 102b is in the process of being rotated. As the front body 102 is rotated about the barrel projection 114, the raised ridges 502 along the inside rim of the front body's rear opening 508 (see FIG. 5) remain seated within the groove 208 at the base of the barrel projection 114 (see FIG. 2), holding the front body 102 on the barrel projection 114 while allowing the front body to rotate freely about the barrel projection. Since the barrel projection 114 physically separates the front body 102 and the ferrule holder 306 (see FIG. 3), this rotation is carried out without a corresponding rotation of the ferrule assembly 106 (which is further prevented from rotating by the hexagonal shape of the inner chamber of barrel projection 114, as described above in connection with FIG. 3). This design facilitates a simple process for reversing the polarity of a fiber optic patch cable associated with the duplexed LC connectors, as will be described in more detail below.

The assembly depicted in FIG. 1 and described above yields a duplexed fiber optic connector assembly suitable for duplex fiber optic cables—e.g., round duplex or other duplex cable types—wherein two optical fibers are enclosed in a common cable that enters the crimp core 122 on the rear side of the unibody housing 116, and wherein the two optical fibers are separatedly routed inside the unibody housing 116 within separate fiber passages 204a and 204b.

Many of the features described above can also be embodied in single LC connectors duplexed by means of a clip, each of which is terminated to a simplex fiber optic cable—each carrying a single optical fiber—to form a simplex LC connector assembly. FIG. 10 is an orthographic view of the components of an example paired simplex fiber optic connectors according to one or more embodiments of this disclosure. These paired simplex embodiments incorporate several of the same components used in the duplexed unibody housing version described above.

For example, the front bodies 102, ferrule assembly 106, and spring 112 are similar to the corresponding components of the duplexed unibody housing assembly. In this paired simplex version, however, the unibody housing 116 is replaced with two rear bodies 1002a and 1002b, corresponding to the respective front bodies 102a and 102b. In FIG. 10, rear body 1002b is depicted as being connected to its corresponding front body 102b, while rear body 1002a is depicted as being separated from its corresponding front body 102a to provide a view of the ferrule assembly 106 and spring 112 that reside inside the front body/rear body assembly.

Figure 11:
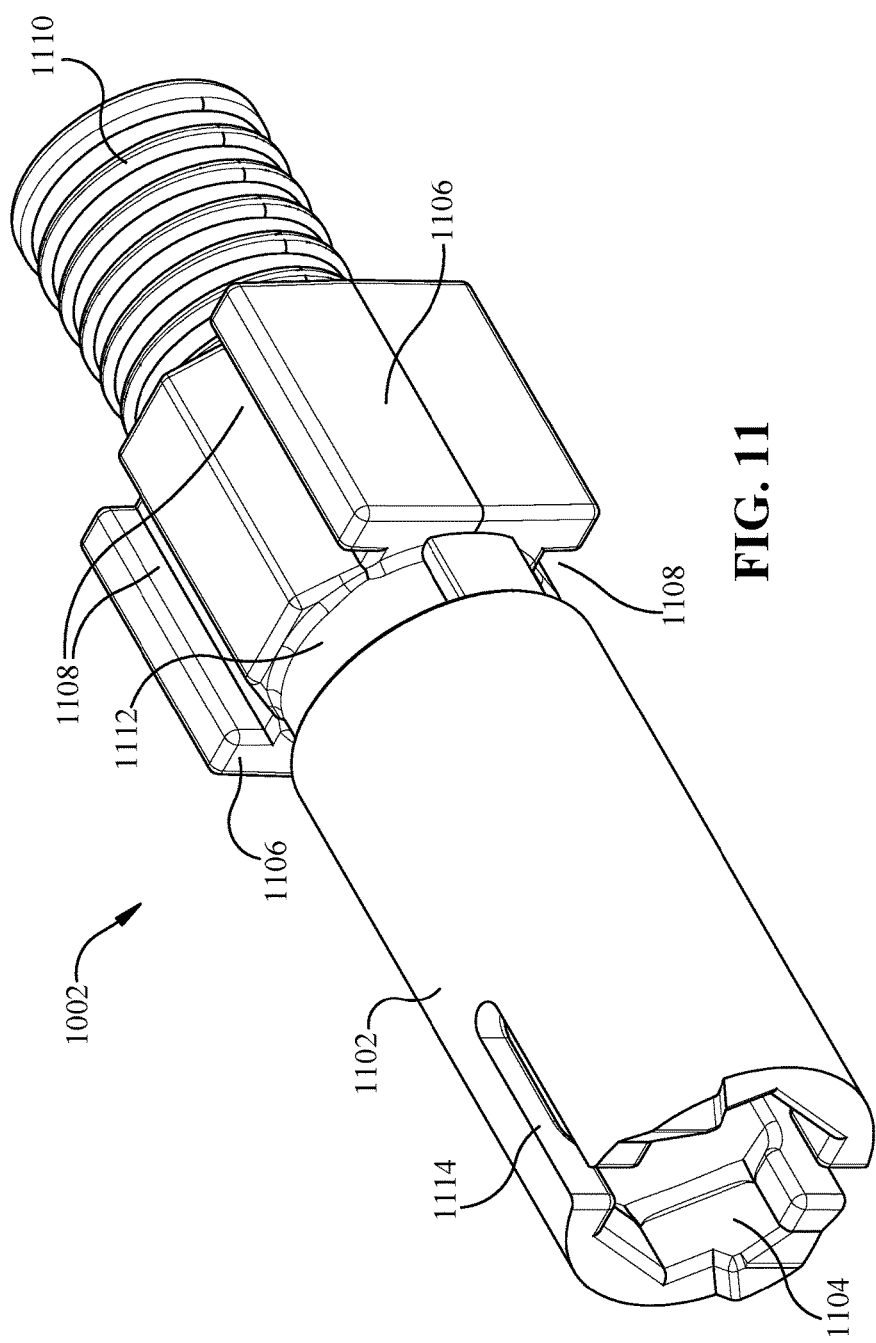
FIG. 11 is an orthographic view of a rear body of a paired simplex fiber optic connector.

FIG. 11 is an orthographic view of a rear body 1002. Similar to the unibody housing 116 of the duplex connector, the rear body 1002 used in the paired simplex connector comprises a barrel projection 1102 having a similar construction to that used in the unibody housing 116 of the duplex design. That is, barrel projection 1102 is hollow throughout its length and includes a front opening 1104 having a hexagonal profile designed to mate with the hexagonal shape of the ferrule holder of ferrule assembly 106 (although other geometric profiles for the front opening 1104 are also within the scope of one or more embodiments of this disclosure). Barrel projection 1102 also includes two or more cuts 1114 that extend from the front opening 1104 to a point part way down the length of the barrel projection. A step or groove 1112 is formed at the base of barrel projection 1102, and either fully or partially traverses the circumference off the barrel projection 1102. The groove 1112 is configured to receive the raised ridges 502 along rim of the rear opening 508 of front body 102 (see FIG. 5).

A crimp core 1110 is located on the rear side of rear body 1002 and, as shown in FIG. 10, is designed to mate with a crimp sleeve 1014 that, together with heat shrink tubing 1010 and hoot 1012, connect a simplex optical cable to the rear body 1002. Although FIG. 10 depicts crimp sleeve 1014, heat shrink tubing 1010, and boot 1012 as the means for affixing an optical cable to the rear body 1002, it is to be appreciated that other means for attaching the cable to the rear body 1002 are within the scope of one or more embodiments of this disclosure.

Spring 112 and ferrule assembly 106 are inserted into the barrel projection 1102 of rear body 1002 via front opening 1104. The optical fiber of a simplex cable attached to the crimp core 1110 enters the rear body 1002 and is attached to the rear connection point of ferrule assembly 106, thereby establishing a communicative connection between the optical fiber and the ferrule assembly. With the ferrule assembly 106 and spring 112 installed in the rear body 1002, front body 102 is slid over the barrel projection 1102 of rear body 1002 in a manner similar to installation of the front body 102 over barrel projection 114 of the unibody housing 116. The raised ridges 502 along the rim of the front body's rear opening 508 latch (see FIG. 5) into the groove 1112 at the base of barrel projection 1102. This latching of the ridges 502 in the groove 1112 serves both to hold the front body 102 in place on the rear body 1002, and to allow the front body to be rotated about the rear body when it is desired to reverse the polarity of the connector, as will be described in more detail below. When the front body 102 is fully installed on the barrel projection 1102, the front portion of the ferrule protrudes through the front opening of the front body 102, while the rest of the ferrule assembly 106 and the spring 112 are housed within the chamber formed by the barrel projection 1102 and the front body 102.

Figure 12:
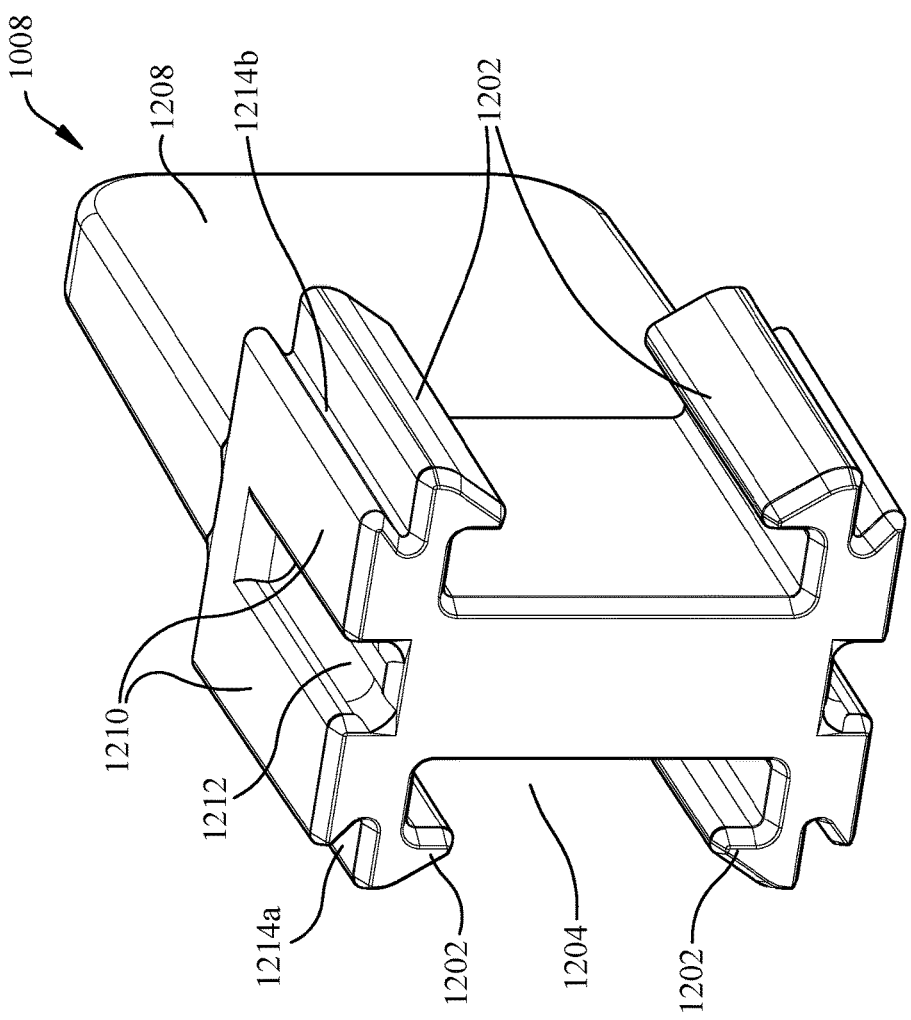
FIG. 12 is an orthogonal view of an example duplex clip for a paired simplex fiber optic connector.

The resulting assembly—comprising a front body 102, a rear body 1002, ferrule assembly 106, and spring 112—yields a simplex LC connector suitable for single conductor connections. In order to pair two simplex cables in a common duplexed connector assembly that can be plugged into a duplex fiber optic adapter (e.g., for patching applications in which two simplex cables act as a send/receive pair comprising a fiber optic circuit), duplex clip 1008 (see FIG. 10) can be used to join two rear bodies 1002 together in a rigid duplex arrangement, and two front bodies 102 can be mounted on the respective two rear bodies 1002. FIG. 12 is an orthogonal view of an example duplex clip 1008 according to one or more embodiments. Duplex clip 1008 comprises an elongated plate 1208, with each of the left and right sides of the plate 1208 having a pair of opposing rails 1202 located along the top and bottom edges of the plate 1208. The rails 1202 begin at the front edge of the plate 1208 and extend part way along the top and bottom edges toward the rear edge of the plate 1208. The two rails on a given side of the plate 1208 are spaced away from the plate and oriented such that the two rails face each other. That is, the rails along the top edge face downward, while the rails along the bottom face upward.

Figure 13:
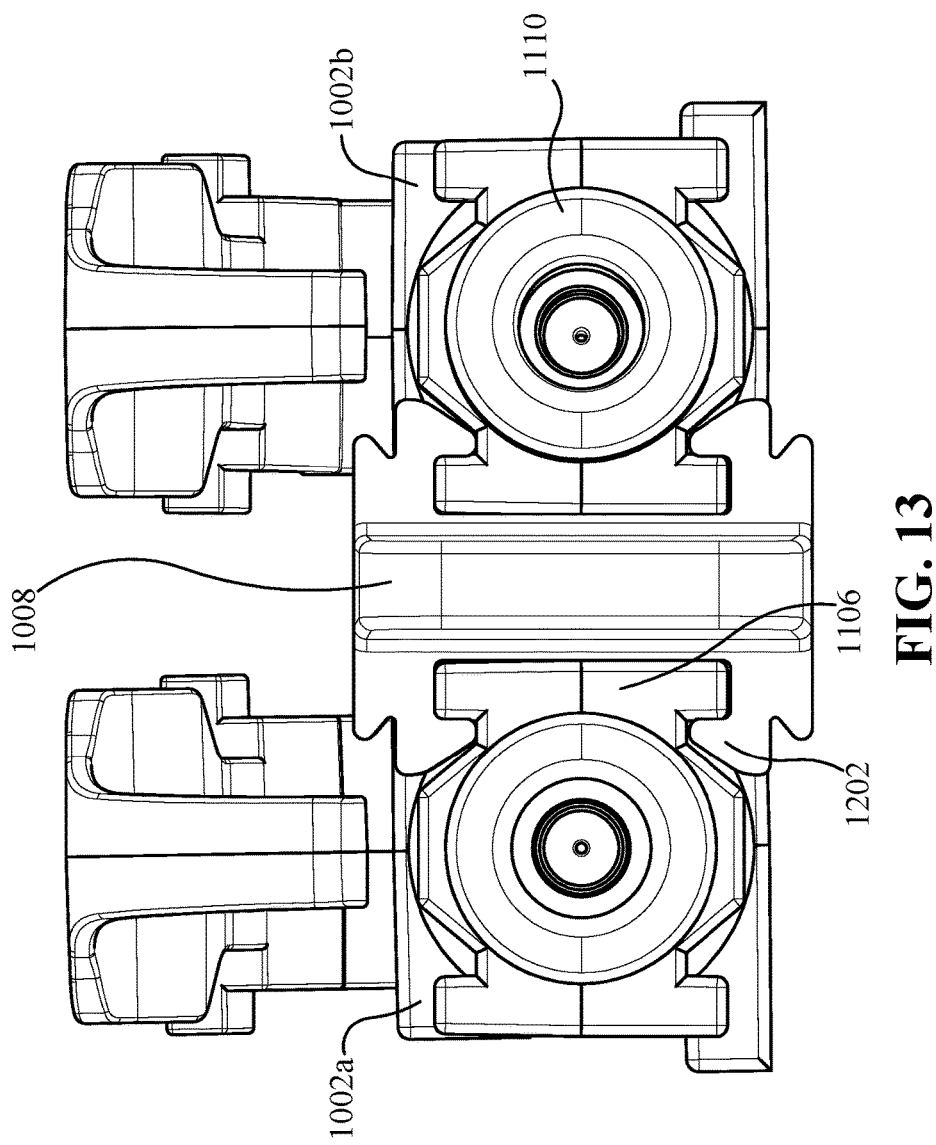
FIG. 13 is a rear view of two rear bodies held together by duplex clip.

The spacing of the rails 1202 from the plate 1208 is set to correspond to a thickness of two side plates 1106 located on the left and right sides of the rear body 1002. These side plates 1106 can be seen in FIG. 11. As shown in FIG. 11, grooves 1108 are defined behind the top and bottom edges of the side plates 1106. The rails 1202 of duplex clip 1008 are designed to slide into these grooves 1108 from the rear side of rear body 1002. When installed in this manner, the side plates 1106 of rear body 1002 reside within the spaces 1204 defined by the top and bottom rails 1202 of duplex clip 1008. FIG. 13 is a rear view of two rear bodies 1002 being held together by duplex clip 1008. As can be seen in FIG. 13, rails 1202 of duplex clip 1008 reside in the grooves 1108 behind the top and bottom edges of the side plates 1106 of the rear bodies 1002, effectively holding the two rear bodies 1002 firmly in place by clasping their inner surfaces.

FIG. 14A is a top view of the assembled pair of simplex LC connectors, comprising the duplex clip 1008, rear bodies 1002a and 1002b held together by the duplex clip 1008, and front bodies 102a and 102b mounted to the barrel projections of the rear bodies 1002. The ferrule assemblies 106 and springs (not shown) reside within the chamber formed by the front and rear bodies, with the front tips of the ferrules protruding through the front openings of the front bodies 102. Duplex clip 1008 is designed to hold the two simplex LC connector assemblies such that the spacing between the two simplex LC connectors conforms to a standard duplex spacing, allowing the paired simplex LC connector assemblies to be plugged into a duplex adapter. The lengths of the duplex clip's rails 1202 and the corresponding area of the rear bodies' side plates 1106—which are held by the rails 1202—are sufficient to rigidly hold the two simplex LC connector assemblies substantially in parallel. The relatively large area of contact between the duplex clip 1008 and the rear bodies' side plates 1106 prevents the two simplex LC connector assemblies from bending toward or away from each other to an excessive degree, thereby reliably maintaining this parallel arrangement. By providing a sturdy and consistent parallel orientation of the paired simplex LC connectors, this design improves user experience by ensuring that the paired simplex LC connector assembly reliably aligns with a mating duplex adapter and maintains the parallel configuration between the duplexed fiber optic signal paths.

Figure 14B:
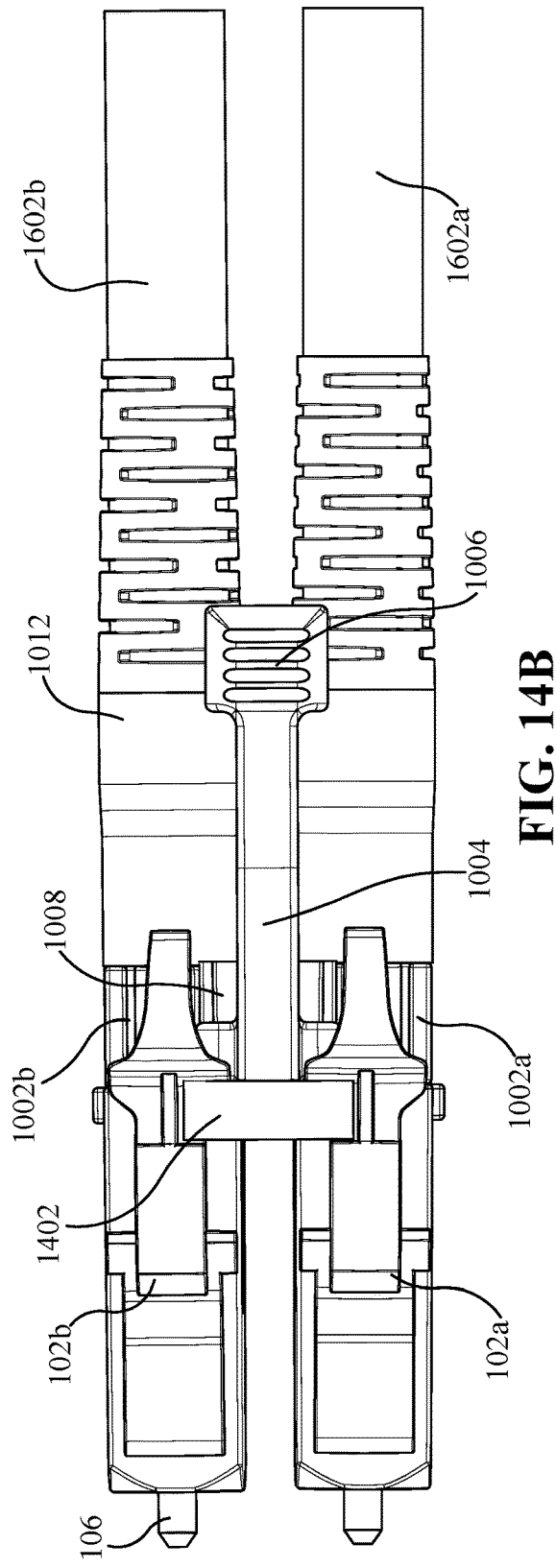
FIG. 14B is a top view of an assembled paired simplex connector including a puller with a duplex clip.
Figure 15:
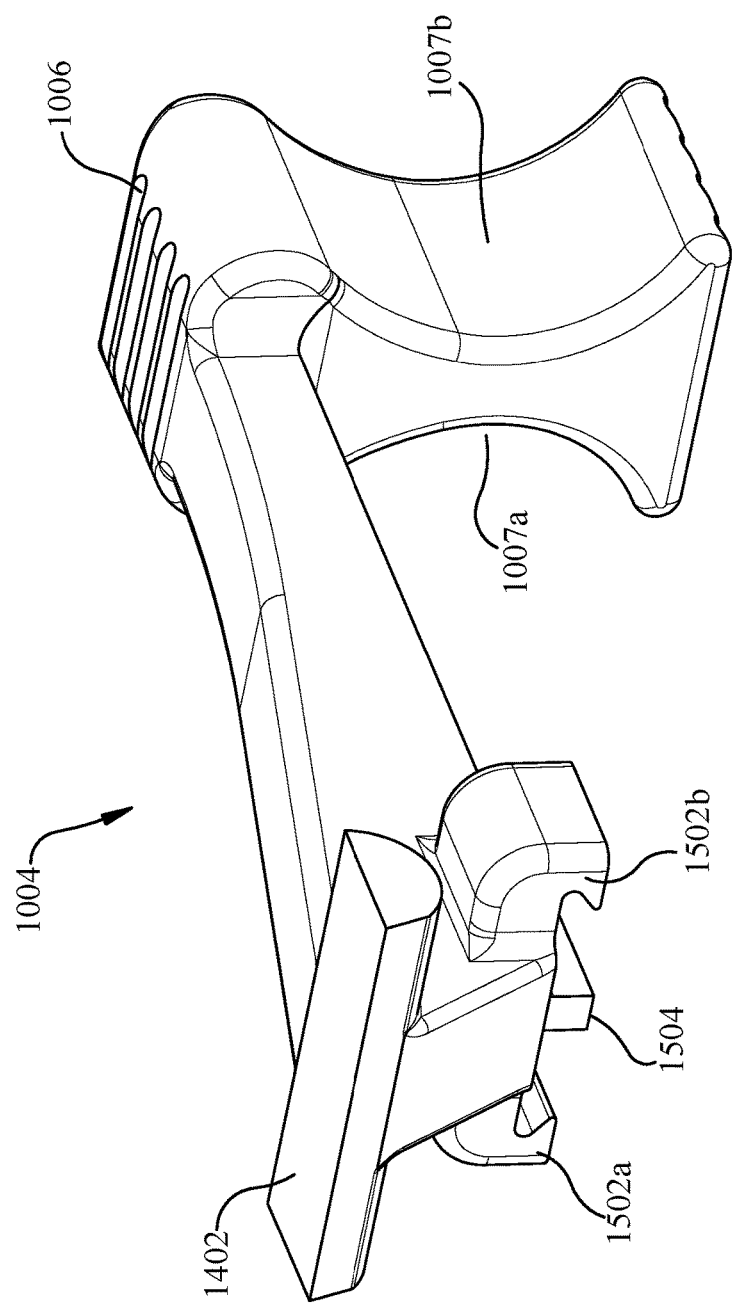
FIG. 15 is an orthographic view of a puller used for a paired simplex connector.
Figure 16A:
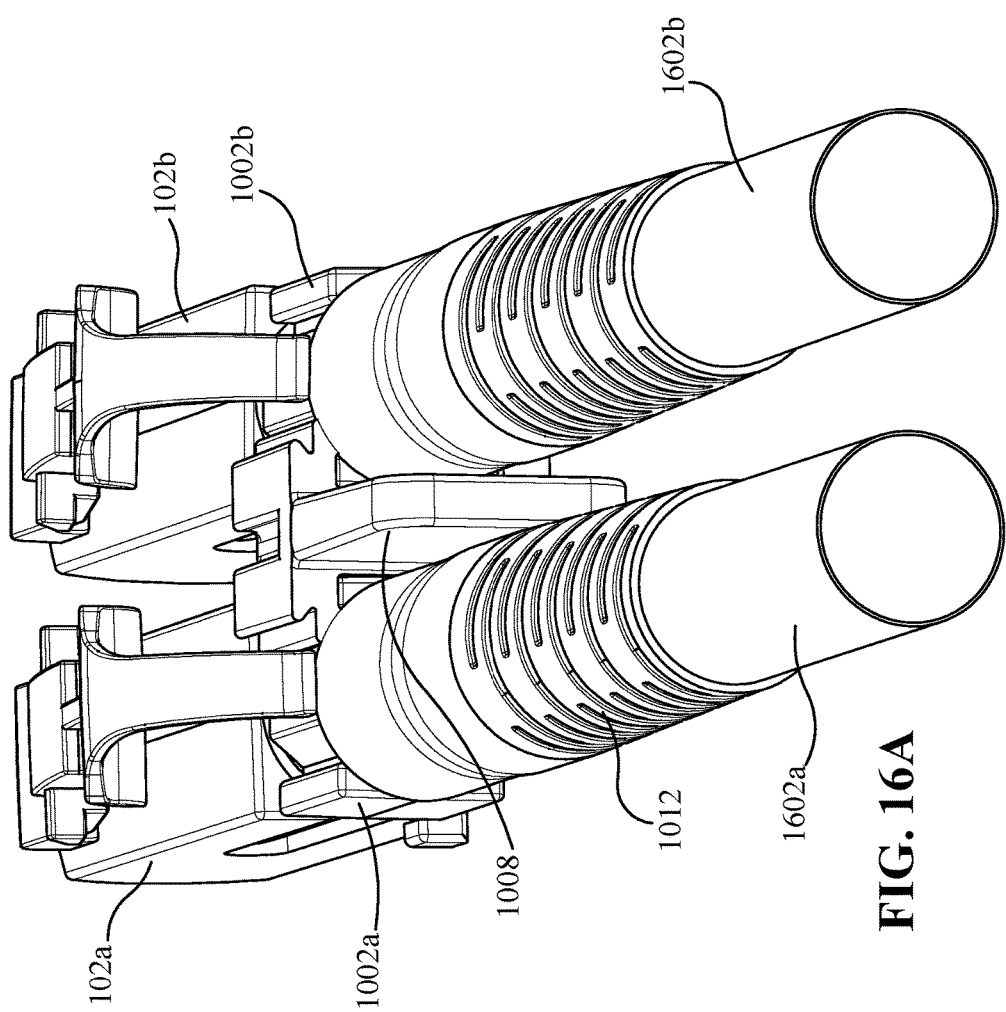
FIG. 16A is an orthographic rear view of a paired simplex connector assembly with a duplex clip without a puller.
Figure 16B:
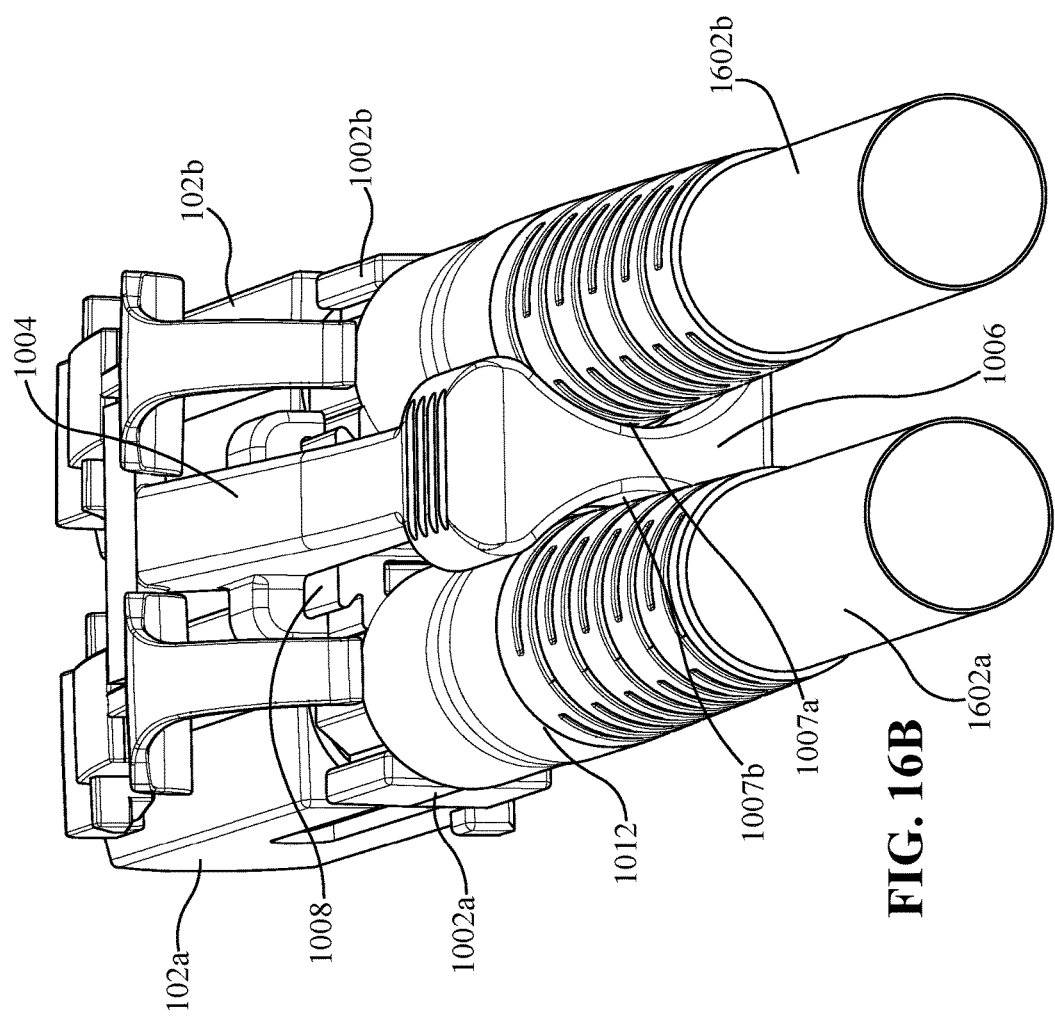
FIG. 16B is an orthographic rear view of a paired simplex connector with a duplex clip including a puller.

As with the duplexed LC connector assembly having unibody housing 116, a puller can be added to the paired simplex LC connector assembly to improve physical access to the paired simplex LC connector assemblies to facilitate insertion into, and removal from, the corresponding duplex adapter in high density connectivity environments. FIG. 14B is another top view of the paired simplex LC connector assembly that adds a puller 1004. Puller 1004 includes a t-bar 1402 connected to a cable anchor 1006 by an arm, FIG. 15 is an orthographic view of the puller 1004 used for the paired simplex LC connector assembly according to one or more embodiments. While having a broadly similar form factor to the puller 108 used in the duplex LC connector assembly with unibody housing 116 described above, a number of design aspects of puller 1004 are adapted for use with the paired simplex LC connector assembly with duplex clip 1008. For example, the cable anchor 1006 comprises two concave surfaces 1007a and 1007b adapted to accommodate the two parallel simplex cables that enter each of the paired simplex LC connectors, respectively, as can be seen in FIGS. 16A and 16B. FIG. 16A is an orthographic rear view of the paired simplex connector assembly with the puller 1004 omitted. As described above, duplex clip 1008 holds two rear bodies 1002 in a parallel orientation, and two front bodies 102 are attached to the barrel projections 1102 of rear bodies 1002, enclosing the ferrule assemblies 106 and springs 112 within the resulting assemblies (see FIG. 10). As shown in FIGS. 14A, 14B, 16A, and 16B, two simplex optical cables 1602 are attached to crimp cores 1110 on the rear sides of the rear bodies 1002 using crimp sleeves 1014, and boots 1012 are slid over the crimp sleeves 1014. The optical fibers of the respective optical cables 1602 enter the rear bodies 1002 via crimp cores 1110 and attach to the ferrule assemblies within the front bodies 102a, 102b and rear bodies 1002a, 1002b.

FIG. 16B is an orthographic rear view of the paired simplex LC connector assembly with puller 1004 attached. The cable anchor 1006 of the puller resides between the two simplex fiber optic cables (e.g., between the two boots 1012), with the concave surfaces 1007a, 1007b of the cable anchor 1006 accommodating the two simplex fiber optic cables.

Returning now to FIG. 15, protrusions 1502a, 1502b, 1504 below the puller's t-bar 1402 are designed to interlock with corresponding grooves formed by puller rails 1210 on the top of duplex clip 1008 (see FIG. 12). FIG. 17 is a front view of the paired simplex LC connector assembly including puller 1004, with the front bodies 102a, 102b removed for clarity. As can be seen in FIG. 17, puller 1004 includes three protrusions 1502a, 1502b, 1504 below t-bar 1402 that reside within corresponding grooves 1214a, 1214b, 1212 formed by the two puller rails 1210 of the duplex clip 1008. In this illustrated embodiment, the grooves 1214a, 1214b, 1212 defined by the two puller rails 1210 include a square groove 1212 between the two rails 1210, a first notched groove 1214a on the left side of the left-hand puller rail 1210, and a second notched groove 1214b on the right side of the right-hand puller rail 1210. To affix the puller 1004 on the duplex clip 1008, the left and right notched grooves 1214a, 1214b on the clip 1008 are configured to receive corresponding V-shaped rails on the left and right protrusions 1502a, 115b of the puller 1004. This design allows the puller 1004 to be mounted on the duplex clip 1008 by aligning the rails of the left and right protrusions 1502a, 1502b with the corresponding notched grooves 1214a, 1214b of the clip 1008, and sliding the t-bar 1402 of the puller 1004 over the duplex clip 1008, either from the front or rear of the duplex clip 1008. In the embodiment illustrated in FIG. 17, puller 1004 also includes a middle protrusion 1504 that resides in the square groove 1212 between the two puller rails 1210 of the clip 1008. This middle protrusion 1504 presents a stop for the puller 1004 operating within the square groove 1212 between the two puller rails 1210 of clip 1008. This middle protrusion stop prevents the puller 1004 from separating from the duplexed LC connector assembly when pulled rearward, and also prevents the t-bar 1402 of puller 1004 from slipping rearward, and out of engagement with, recessed areas 512 disposed in latches 506 of front bodies 102a, 102b (see FIGS. 5 and 10).

Note that similar puller rails 1210 are also located on the bottom of duplex clip 1008, yielding a symmetrical profile. Mirroring the puller rails 1210 on both the top and bottom of the clip 1008 assists in the polarity reversal technique to be described in more detail below in connection with FIGS. 20A-20F.

Figure 18:
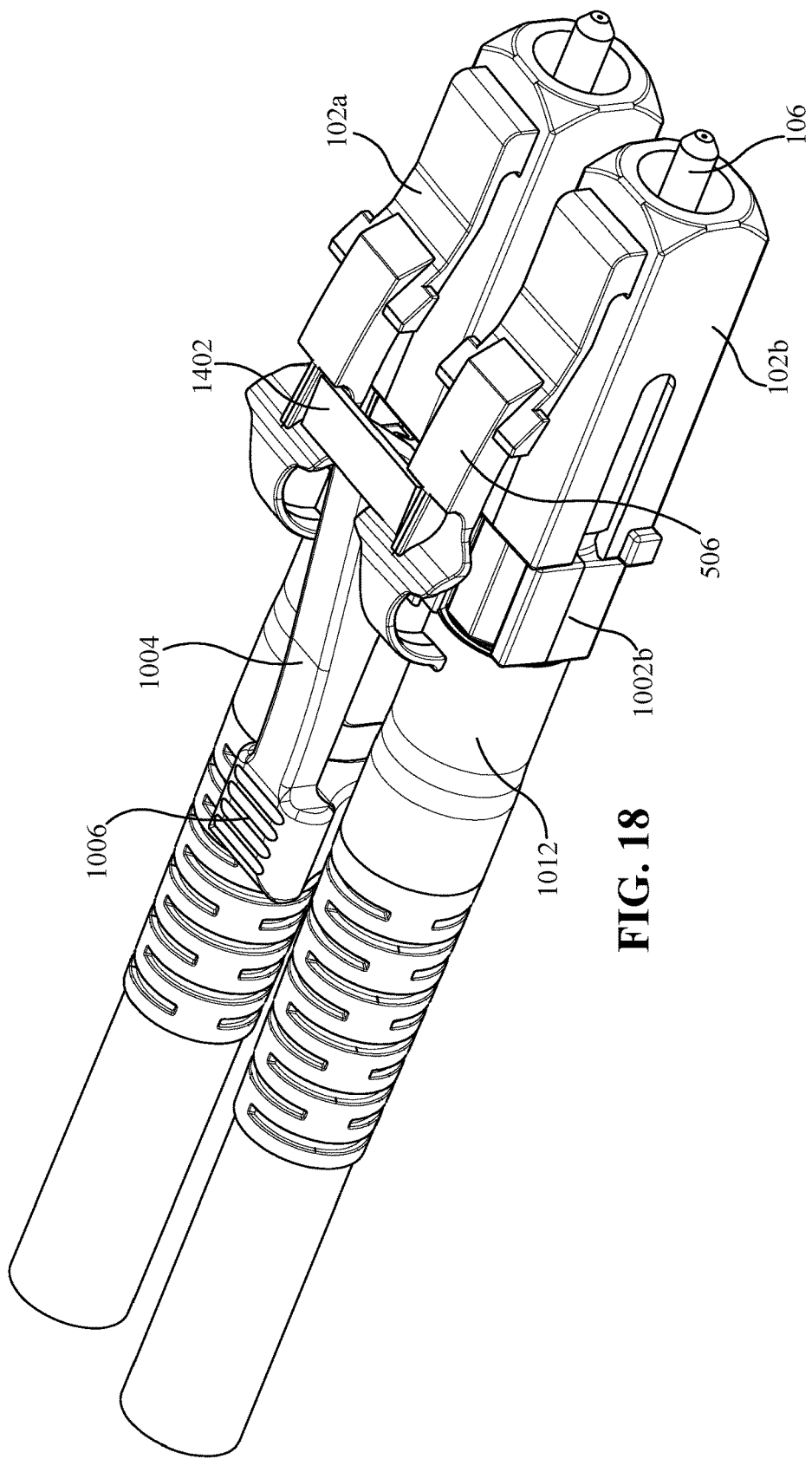
FIG. 18 is an orthographic view of a paired simplex connector with a duplex clip including a puller.

FIG. 18 is an orthographic view of the paired simplex LC connector assembly including the puller 1004. With the puller 1004 in place, the t-bar 1402 provides an easily accessible means for removing the paired simplex LC connector assembly from a duplex adapter. Note that the left and right sides of t-bar 1402 reside within the recessed areas 512 formed in latches 506 of the front bodies 102a, 102b (see FIGS. 5 and 10), ensuring that a pulling force applied both sides of t-bar 1402 is distributed substantially equally to the two simplex LC connectors of the paired LC connector assembly.

Figure 19:
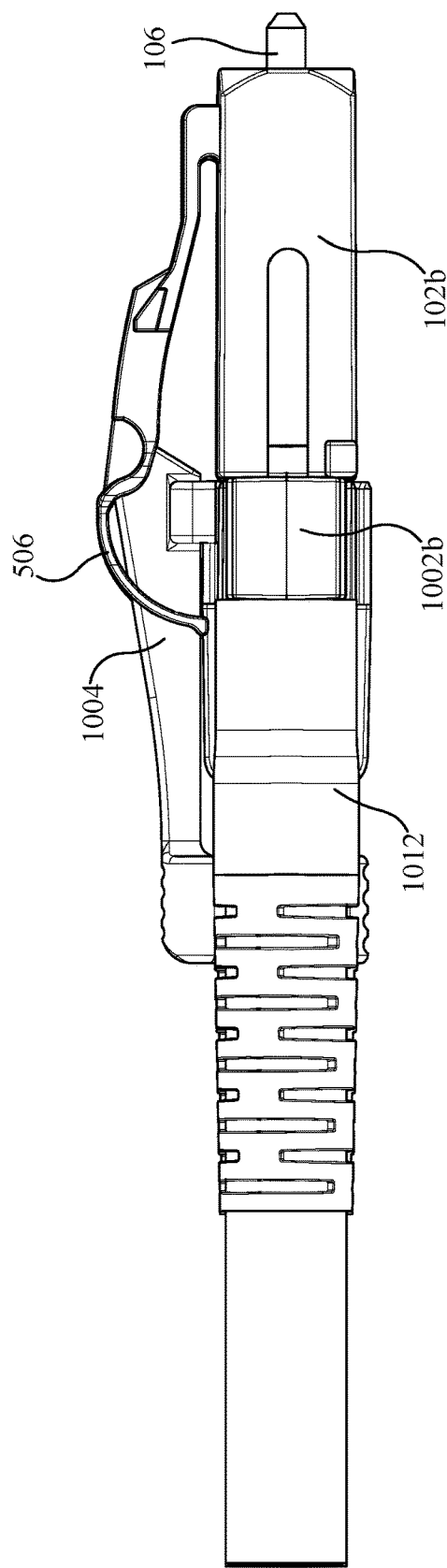
FIG. 19 is a side view of a paired simplex connector with a duplex clip including a puller.

FIG. 19 is a side view of the paired simplex LC connector assembly including the puller 1004. Note that the puller 1004 is designed such that the addition of the puller 1004 to the paired LC connector assembly does not introduce additional height to the paired LC connector assembly's vertical profile. That is, the top surface of the puller 1004 does not extend upward past the top surface of the latches 506 of front bodies 102a, 102b. This ensures that the puller 1004 not interfere with adjacent connectors or cables in high density connectivity installations.

The designs of both the duplex and the paired simplex connectors described above allow the polarity of the fiber optic circuitry of the connectors and cabling to be reversed easily in the field with little or no risk of twisting or tangling the optical fibers comprising the circuit, even when a puller (e.g., puller 108 or puller 1004) is included as part of the connector assembly. FIGS. 20A-20F are orthographic views of the paired simplex LC connector assembly illustrating a sequence for reversing the polarity of the fiber optic circuitry. Although FIGS. 20A-20F illustrate polarity reversal for the circuitry of a paired simplex LC connector assembly with duplex clip 1008, it is to be appreciated that a similar operation can be used to reverse the polarity for the duplex LC connector assembly with the unibody housing 116 described above.

Figure 20A:
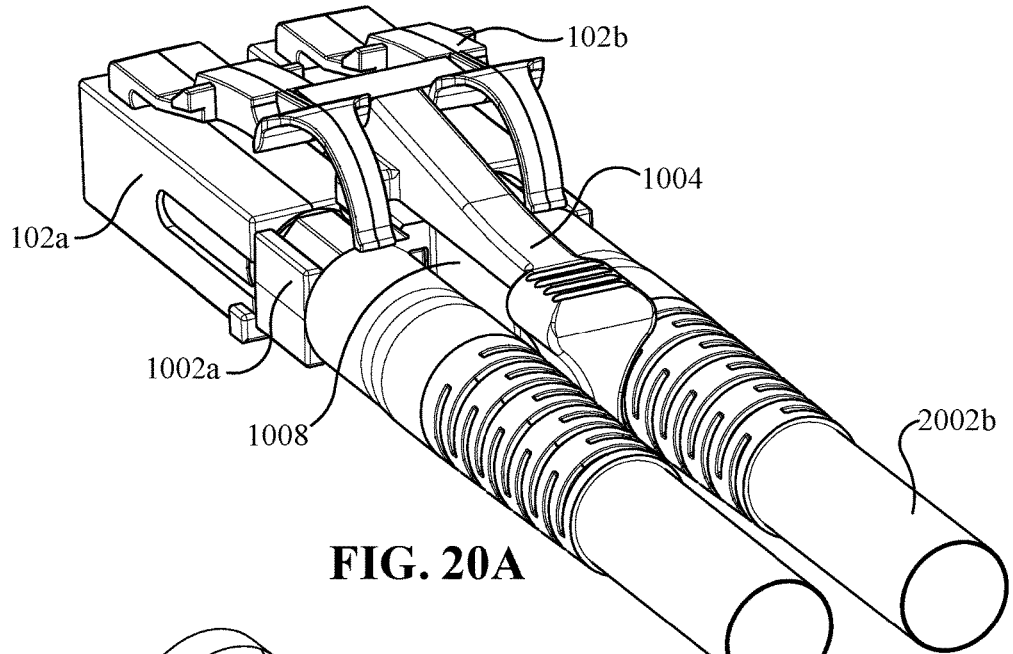
FIG. 20A is an orthographic view of a paired simplex connector with a duplex clip and puller illustrating a first step of a sequence for reversing the polarity of the connector.

FIG. 20A is an orthographic rear view of the paired simplex LC connector assembly, which is used to connect two simplex fiber optic cables 2002a and 2002b to a duplex adapter. In the current default polarity, cable 2002a is connected to the left side of the paired simplex LC connector assembly while cable 2002b is connected to the right side. Thus, when the paired simplex LC connector assembly is plugged into a duplex adapter (not shown in the figures), cable 2002a will be plugged into the left port of the duplex adapter while cable 2002b will be plugged into the right port of the duplex adapter.

Figure 20B:
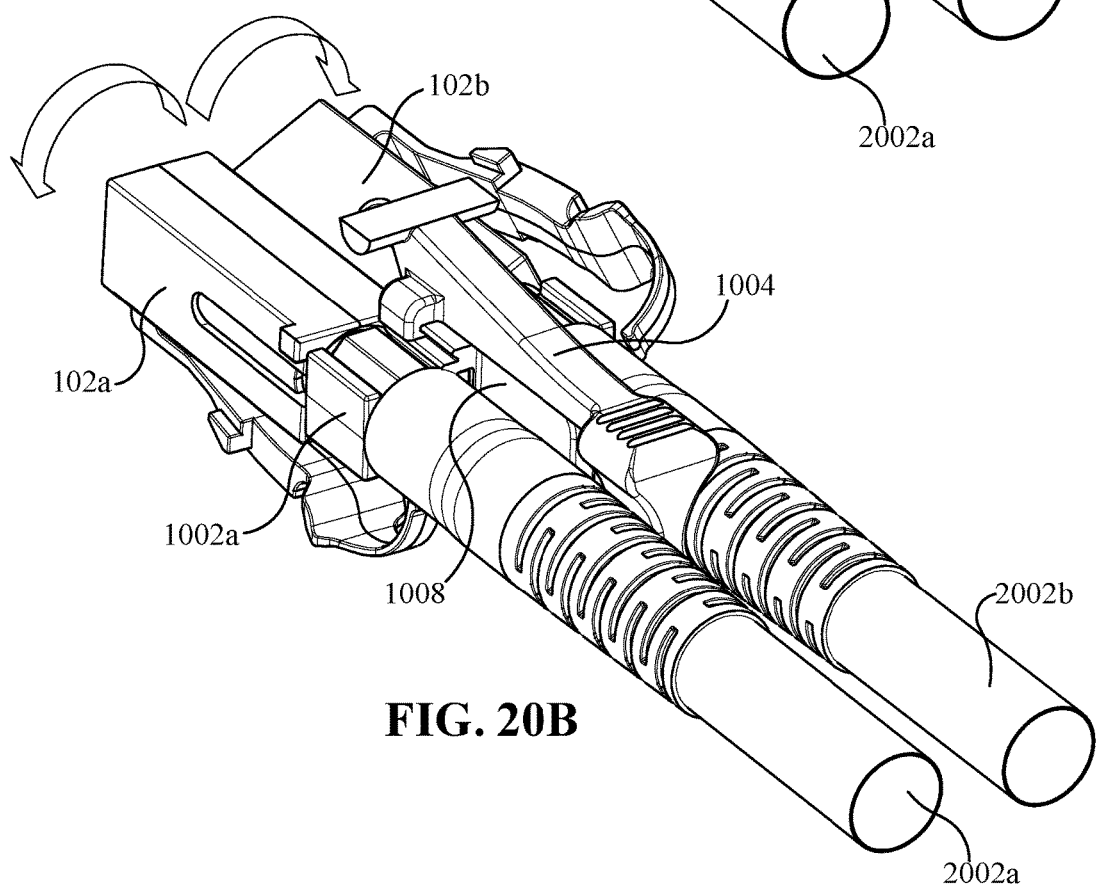
FIG. 20B is an orthographic view of a paired simplex connector with a duplex clip and a puller illustrating a second step of a sequence for reversing the polarity of the connector.

To reverse the polarity of the paired simplex LC connectors, and corresponding cables 2002a, 2006, comprising the assembly, the following steps can be carried out. As shown in FIG. 20B, the front bodies 102a, 102b are rotated 180 degrees about the barrel projections 114 of rear bodies 1002a, 1002b (or unibody housing 116). As described above in connection with FIGS. 9A and 9B, since the front bodies 102a, 102b are mounted in a rotatable manner on the barrel projections 114, and the ferrule assemblies 106 are installed inside the barrel projections 114 in a fixed manner, the front bodies 102a, 102b can be rotated without causing a corresponding rotation of the ferrule assemblies 106, thereby preventing twisting of the ferrule assemblies 106 and the optical fibers disposed therein. At the completion of this step in the polarity reversal process, the paired simplex LC connectors of the assemblies are is in an upside-down orientation vis-à-vis the duplex clip 1008 (or unibody housing 116) compared to the starting position.

Figure 20C:
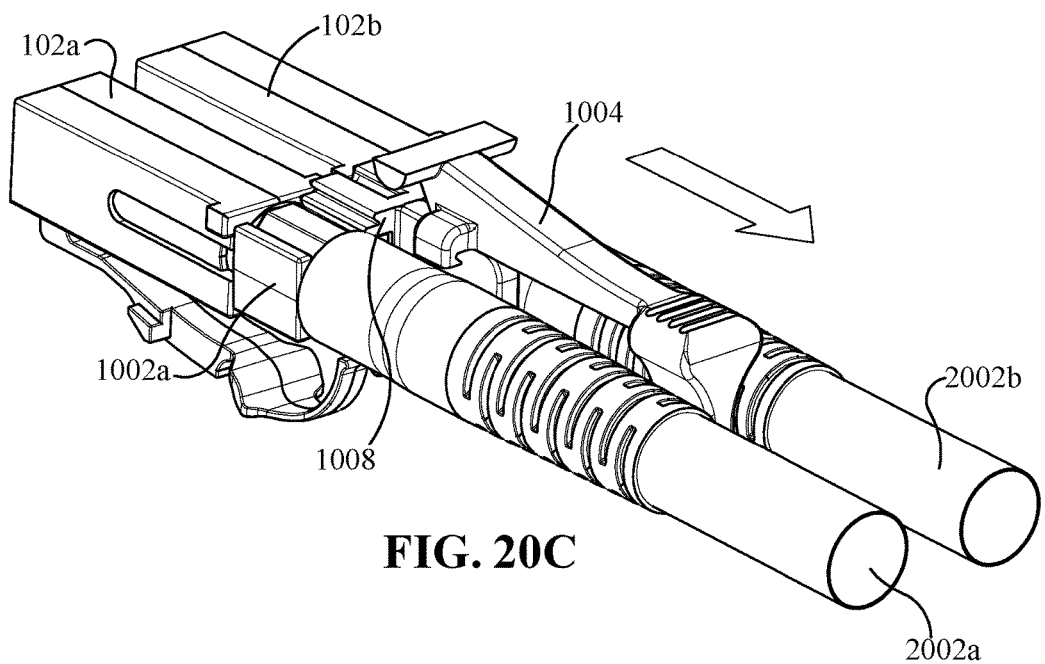
FIG. 20C is an orthographic view of a paired simplex connector with a duplex clip and a puller illustrating a third step of a sequence for reversing the polarity of the connector.
Figure 20D:
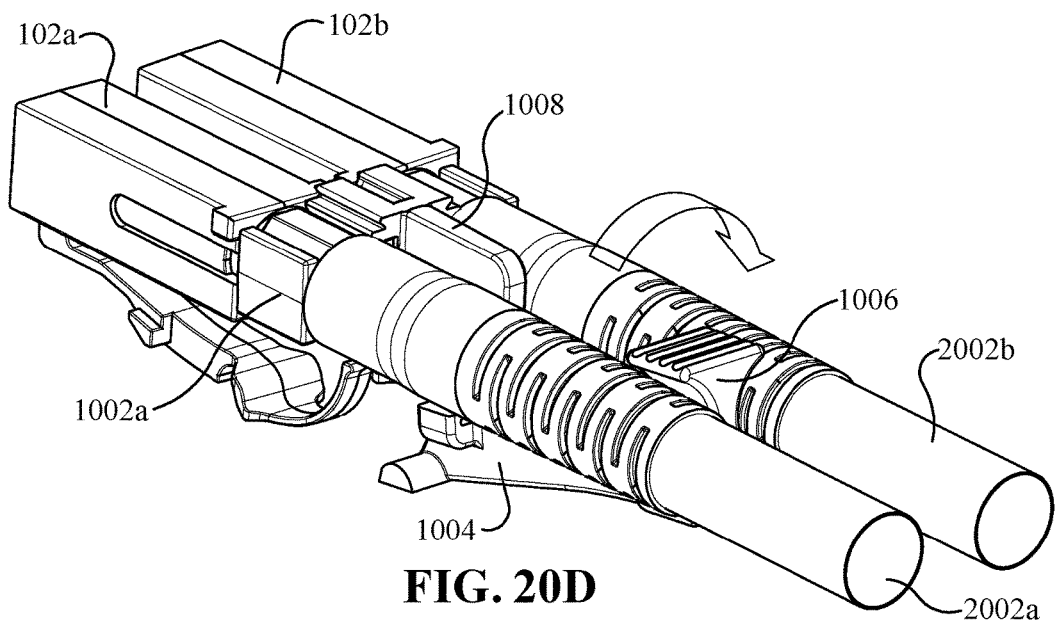
FIG. 20D is an orthographic view of a paired simplex connector with a duplex clip and a puller illustrating a fourth step of a sequence for reversing the polarity of the connector.
Figure 20E:
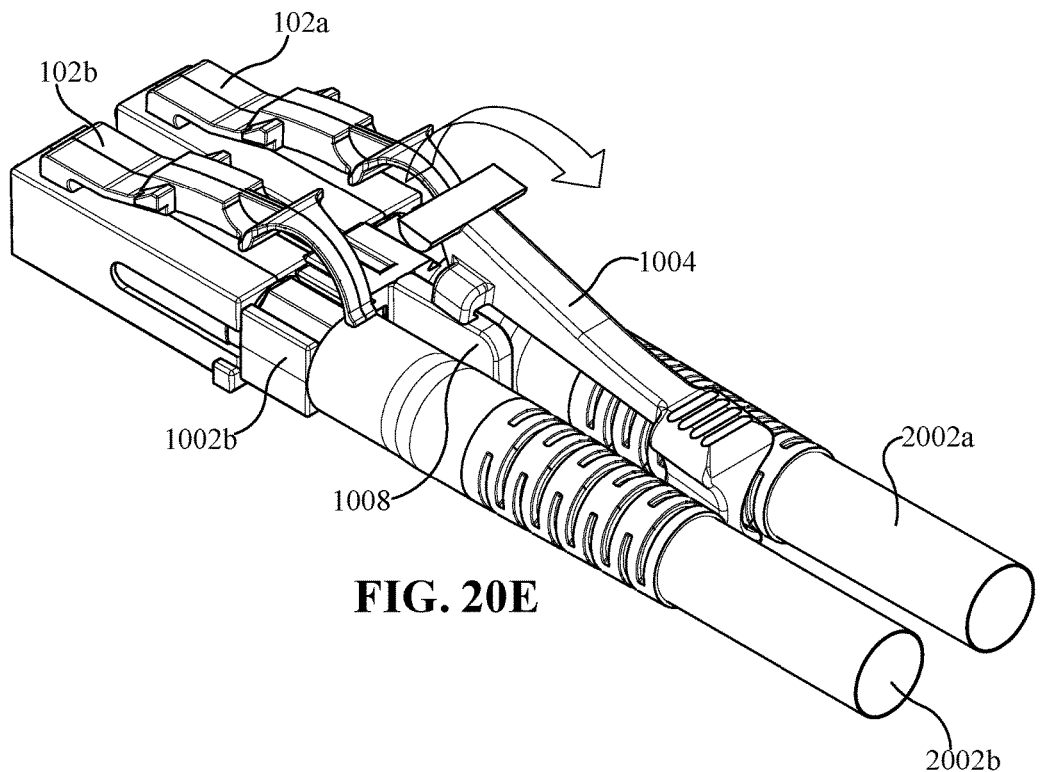
FIG. 20E is an orthographic view of a paired simplex connector with a duplex clip and a puller illustrating a fifth step of a sequence for reversing the polarity of the connector.

Next, as shown in FIG. 20C, the puller 1004 is removed from the paired simplex LC connector assembly. In the case of the paired simplex assembly with duplex clip 1008, this can be achieved by sliding the puller 1004 forward, away from cables 2002a, 2002b, so that the t-bar 1402 of puller 104 can be disengaged from the recessed areas 512 in the latches 506 of front bodies 102a, 102b, and thereby disconnecting the protrusions 1502a, 1502b, 1504 of puller 1004 from the puller rails 1210 on top of the duplex clip 1008. The puller 1004 can then be pulled backward toward the cables 2002a, 2002b to facilitate removal of the puller 1004 from the paired simplex LC connector assembly. Since the cable anchor 1006 of puller 1004 is held between the two cables 2002a, 2002b, the risk of the puller 1004 falling from the paired simplex LC connector assembly during this step in the polarity reversal process is minimized. The puller 1004 is then moved to the opposite side of the paired simplex LC connector assembly, as shown in FIG. 20D. At this stage, the puller 1004 is not yet reattached to the duplex clip 1008. The entire paired simplex LC connector assembly is then rotated, as shown in FIG. 20E. Note that this rotation causes cables 2002a and 2002b to be reversed in position vis-à-vis the duplex clip 1008 (or unibody housing 116), while also causing the paired simplex LC connector assembly to be reoriented in the right-side-up position. Finally, the puller 1004 is reattached to the duplex clip 1008 by aligning the protrusions 1502a, 1502b, 1504 of puller 1004 with the puller rails 1210 on the duplex clip 1008 and sliding the puller 1004 backward, causing the front of the puller 1004 to engage with the clip 1008. Note that the puller rails 1210 on the duplex clip 1008 to which the puller 1004 is attached during this step are those that were located on the bottom of the clip in FIG. 20A, but which are now in the top position due to the rotation during polarity reversal shown in FIG. 20E. Since the same puller rails 1210 are located on both the top and bottom of the duplex clip 1008, the polarity reversal can be achieved without disconnecting the clip 1008 from the rear bodies 1002.

In the embodiment using the unibody housing 116, attachment of the puller 108 to the duplexed LC connector assembly is achieved by inserting protrusion 702 of puller 108 (see FIG. 7) into a corresponding recess 212 in the unibody housing 116 (see FIGS. 2, 9A, 9B), where this recess 212 is accessible on both the top and bottom sides of the unibody housing 116.

Figure 20F:
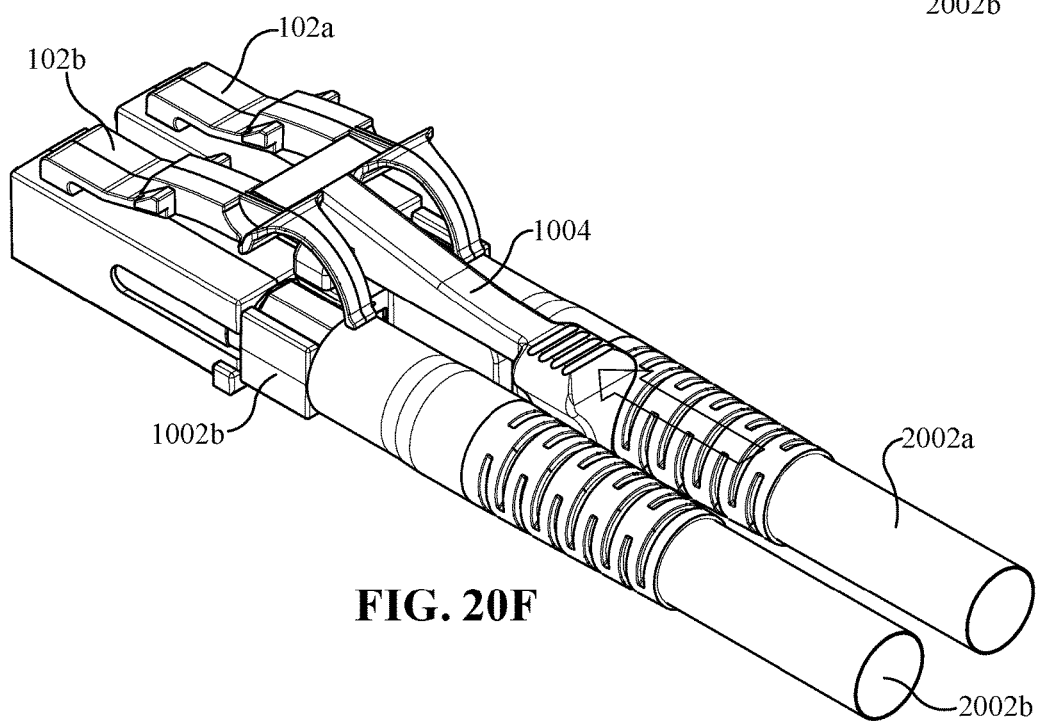
FIG. 20F is an orthographic view of a paired simplex connector with a duplex clip and a puller illustrating a sixth step of a sequence for reversing the polarity of the connector.

As shown in FIG. 20F, cables 2002a and 2002b have reversed position relative to the position of cables 2002a and 2002b shown in FIG. 20A, such that cable 2002b will be plugged into the left port of a duplex adapter, and cable 2002a will be plugged into the right port. Reversal of the polarity of the cabling and paired simplex LC connectors, or duplexed LC connectors, of the assemblies with respect to the duplex clip 1008 or unibody housing 116, respectively, is now complete.

In some embodiments, the LC connectors of the assemblies can include visual features that assist a user in identifying the current polarity configuration of the assembled connectors. For example, as shown in FIG. 8B, the top surface of the unibody housing 116 of the duplexed connector can be marked with identifying characters that distinguish the top of the duplexed connector from the bottom of the duplexed connector. In the example depicted in FIG. 8B, the top of the duplexed connector is embossed with a letter "B" on the left side, and a letter "A" on the right side. Seeing these letters embossed on top of the duplexed connector can indicate to the user that the duplexed connector is currently configured for its default, or as-built, polarity. The reverse side of unibody housing 116 may be embossed with a different combination of characters e.g., the letter "A" on both the left and right sides—which become oriented on the top side of the duplexed connector when the polarity is reversed. Seeing this alternative pair of characters can indicate to the user that the duplexed connector has been reconfigured for polarity reversal. It is to be appreciated that other distinguishing characters or marks can be used on the top and bottom surfaces of the duplexed connector without departing from the scope of one or more embodiments of this disclosure.

The procedure outlined above in connection with FIGS. 20A-20F allows a user to quickly and easily reverse the polarity of the duplexed connector in the field without twisting or damaging the optical fibers connected to the ferrules inside the connector housings, and without requiring the user to disassemble the connector housing in order to access the ferrule assemblies housed therein. The design of the duplex and paired simplex connectors described herein allow this polarity reversal feature to be implemented even when a puller is included as part of the connector assembly, since the puller can be easily relocated to the appropriate side of the connector as needed.

Figure 21:
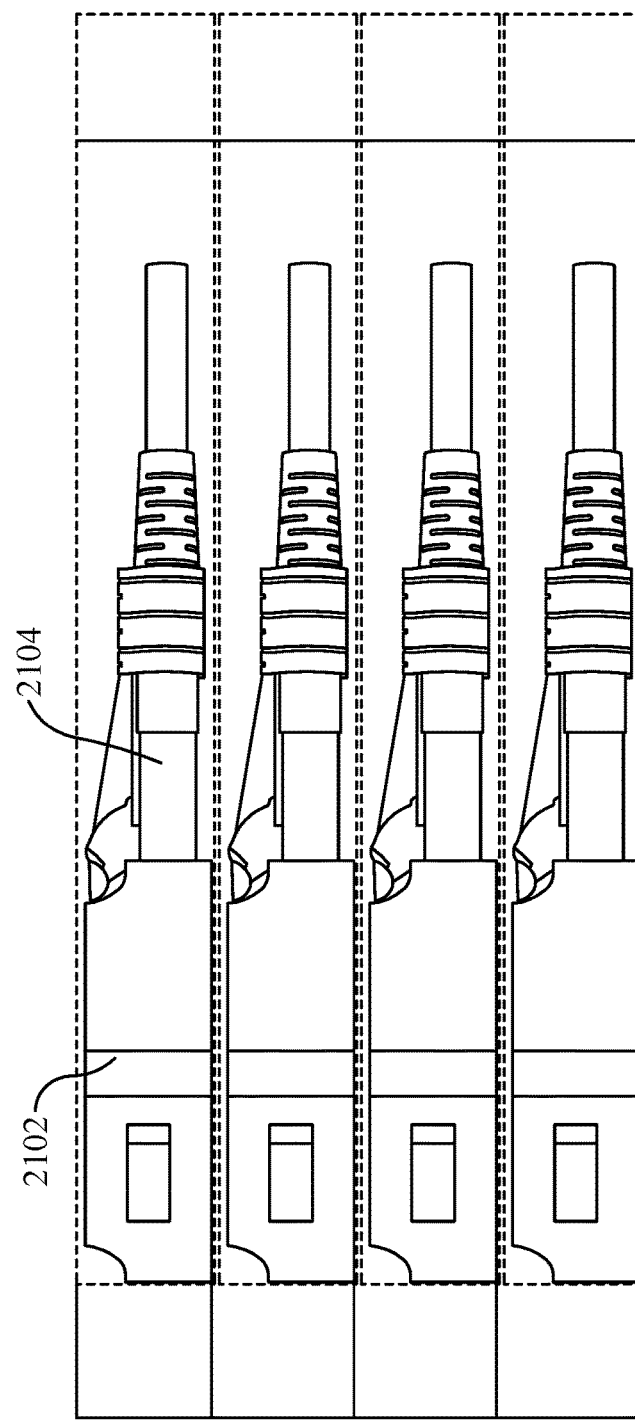
FIG. 21 is a side view of an example high density patching installation comprising a number of stacked adapters.

As noted above, the relatively low vertical profile of the duplexed and paired simplex connectors described herein render these connectors suitable for use within high density connectivity installations. FIG. 21 is a side view of an example high density connectivity installation comprising a number of stacked adapters 2102, each adapter comprising a row of duplexed data ports into which duplexed or paired simplex connectors 2104 can be inserted. As illustrated by the dashed boxes, the vertical profile of the connector design described herein is low enough to remain within the profile dimensions of the adapters 2102. Their low vertical profile allows the connectors 2104 to be installed in high density connectivity applications without interference between adjacent connectors 2104.

Figure 22:
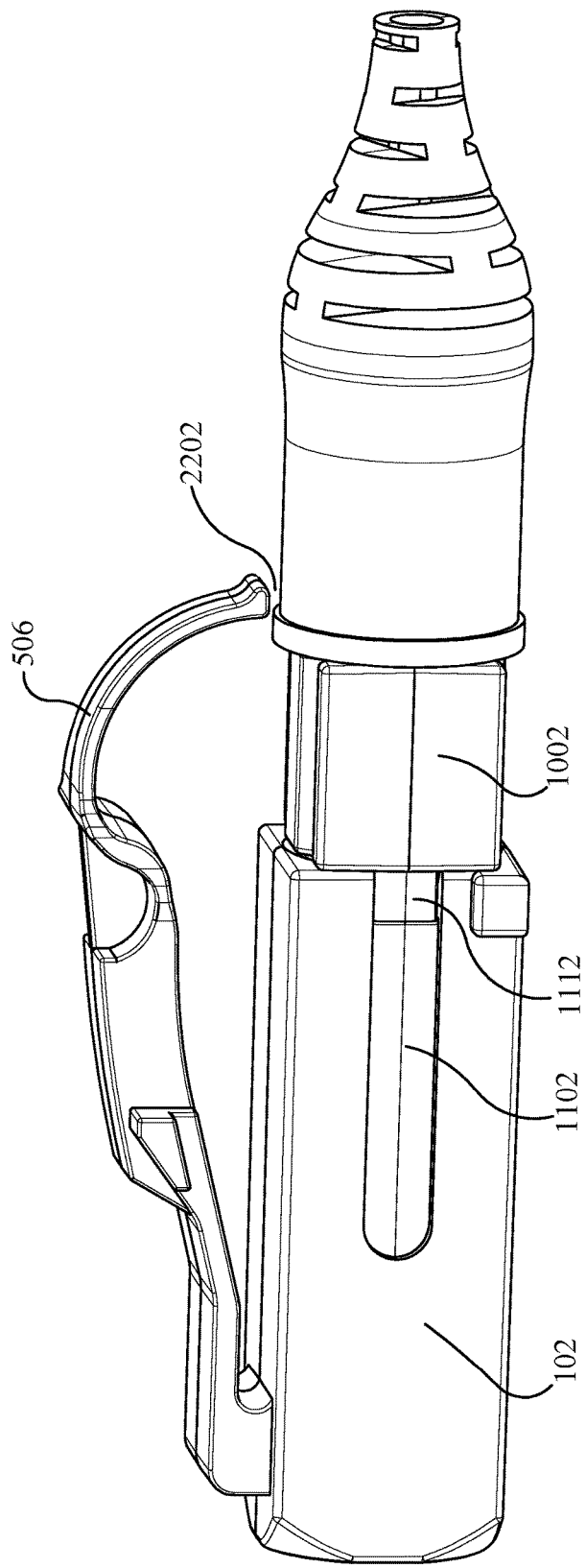
FIG. 22 is a side view of an example simplex fiber optic connector.

To further reduce the risk of the connector becoming entangled with cables within such high density connectivity environments, the latch 506 of the front body 102 can comprise a long arch that extends nearly to the body of the connector, as shown in FIG. 22. As can be seen in FIG. 22, the arch of the latch 506 extends such that the space 2202 between the end of the latch 506 and the connector housing is small, while the arch is flexible enough to allow a user to bend the latch 506 downward sufficiently to disengage the latch from a mated adapter. Keeping this space 2202 small reduces the risk of cables becoming snagged by the latch 506 as the connector is pulled through a high density connectivity environment.

The duplexed and paired simplex connectors described herein incorporate a number of design features that address a number of functional and perceptual issues that arise in fiber optic patching applications. For example, the relatively small number of parts required for the connector assemblies described herein can reduce manufacturing costs while providing a more rigid structure relative to connectors that incorporate a greater number of components. By enclosing the ferrule assemblies within grooved barrel structures 114 over which the front bodies 102 can be mounted, such that the front bodies can be rotated about the barrel projection 114 without rotating the ferrule assemblies 106, the connectors described herein allow users to quickly and easily reverse the polarity of the connectors and cabling in the field (e.g., from crossed to straight-through, or vice versa) without twisting or entangling the optical fibers housed within the connectors, and without opening the connector housing. This polarity reversal feature is implemented in a connector design that also allows for installation of a puller (e.g., puller 108 or 1004) that facilitates easy access to the connector in congested connectivity environments for ease of connector insertion and removal from corresponding duplex adapters. The chamfered front edges of the front bodies 102 of the connectors can improve the ease with which the connectors are inserted into a fiber adapter, particularly in low visibility, or close, areas where precise manual alignment between the connector and a corresponding adapter is not easily achieved.

Figure 23:
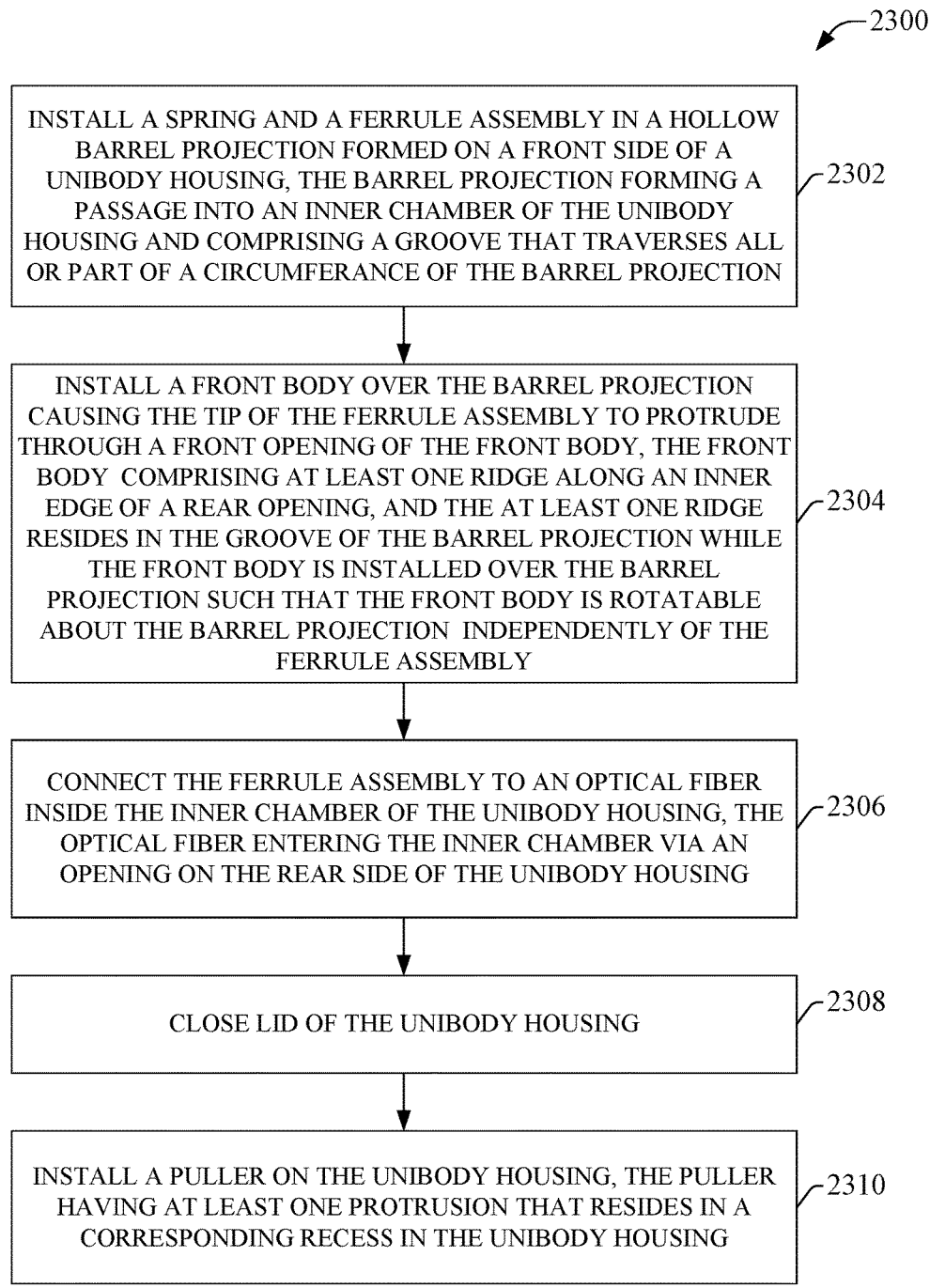
FIG. 23 is a flowchart of an example methodology for assembling a duplex fiber optic connector.
Figure 24A:
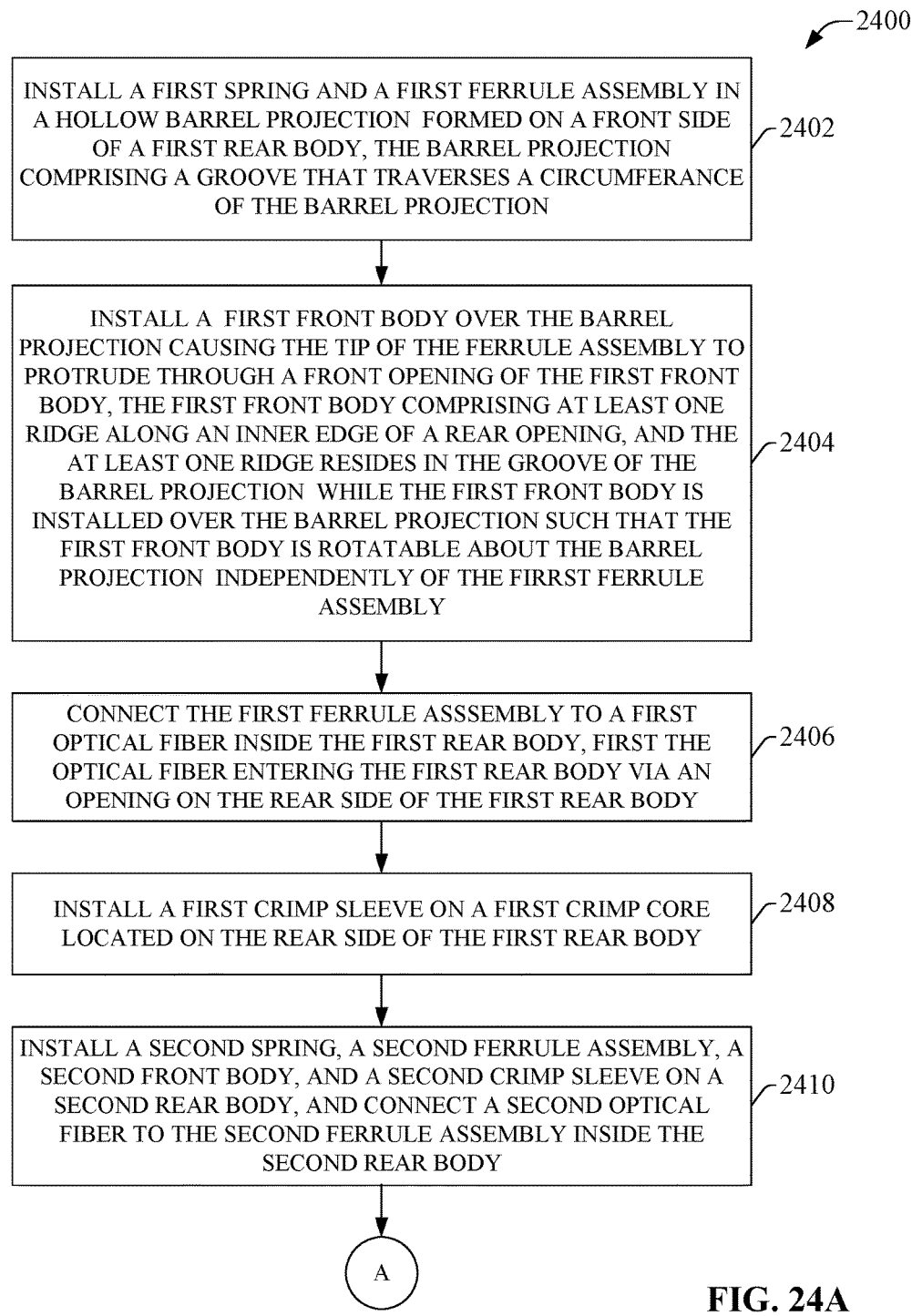
FIG. 24A is a first part of a flowchart of an example methodology for assembling a paired simplex fiber optic connector assembly.
Figure 24B:
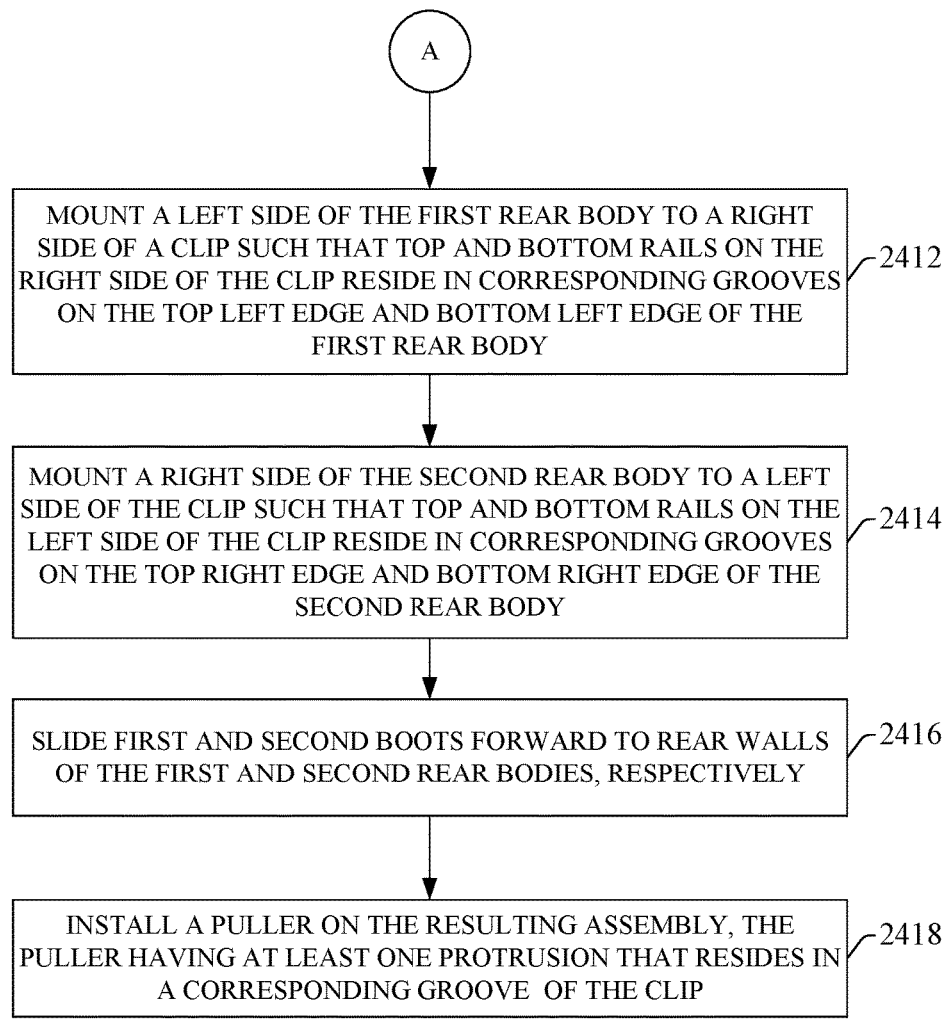
FIG. 24B is a second part of a flowchart of an example methodology for assembling a paired simplex fiber optic connector assembly.
Figure 25:
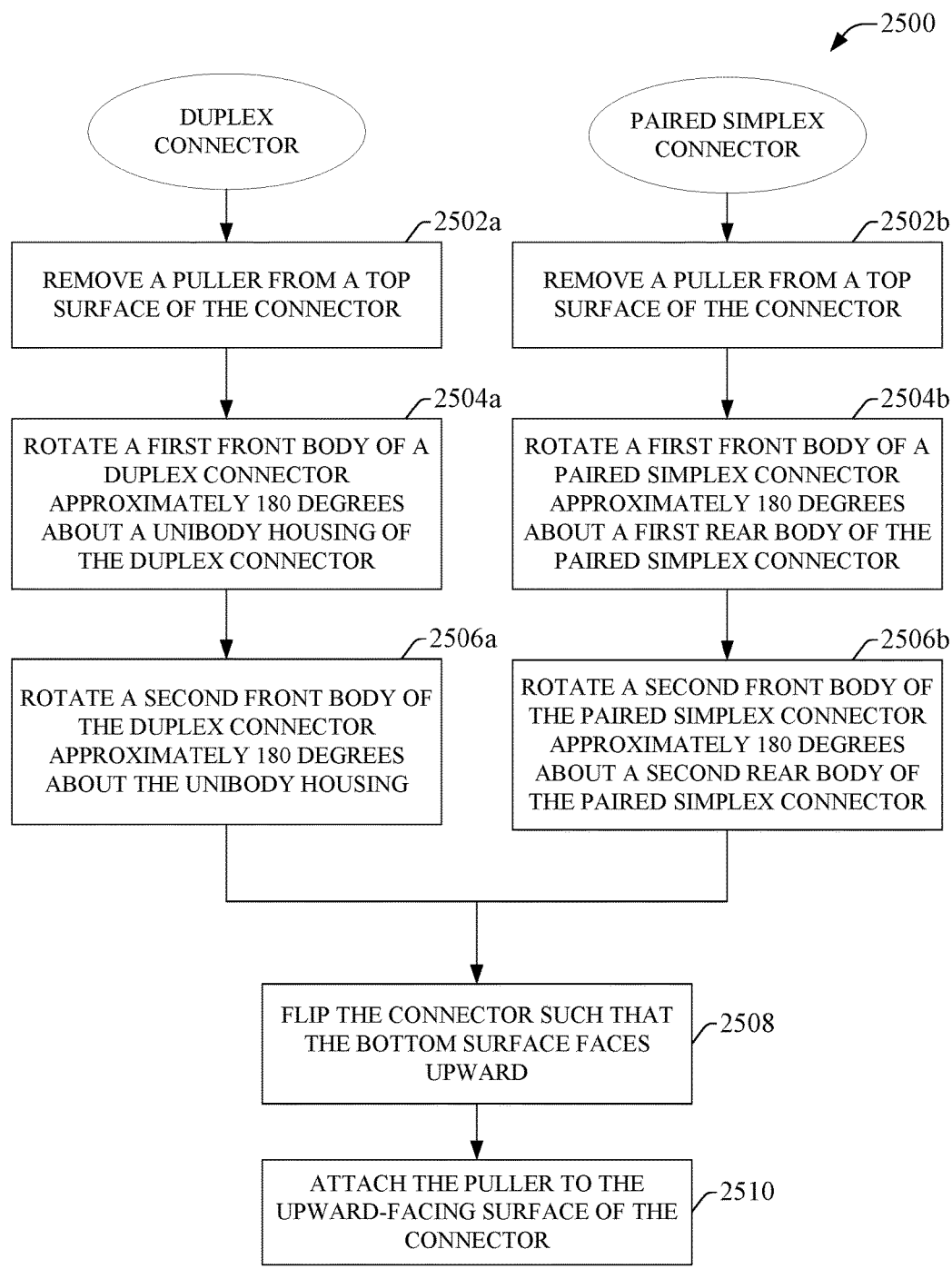
FIG. 25 is a flowchart of an example methodology for reversing the polarity of a duplex connector assembly or a paired simplex connector assembly.

FIGS. 23-25 illustrate various methodologies in accordance with one or more embodiments of the subject application. While, for purposes of simplicity of explanation, the one or more methodologies shown herein are described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 23 illustrates an example methodology 2300 for assembling a duplexed fiber optic connector according to one or more embodiments described herein. Initially at 2302, a spring and a ferrule assembly are installed in a hollow barrel projection formed on a front side of a unibody housing, the barrel projection forming a passage into an inner chamber of the unibody housing and comprising a groove that traverses all or part of the circumference of the barrel projection.

At 2304, a front body is installed over the barrel projection, causing the tip of the ferrule assembly to protrude through a front opening of the front body. The front body comprises at least one ridge along an inner rim or edge of the rear opening, and the at least one ridge resides in the groove of the barrel projection while the front body is installed over the barrel projection, such that the front body is rotatable about the barrel projection independently of the ferrule assembly At 2306, the ferrule assembly is connected to an optical fiber inside the inner chamber of the unibody housing, the optical fiber entering the inner chamber via an opening on the rear side of the unibody housing. Steps 2302-2306 can be repeated for a second barrel projection formed on the front side of the unibody housing, a second front body, a second ferrule assembly, and a second spring, thereby completing the duplexed assembly for two optical fibers of an incoming duplex fiber optic cable. At 2308, a lid is closed or installed on the unibody housing, enclosing the connections made at 2306 within the housing. At 2308, a puller is installed on the unibody housing, the puller having at least one protrusion that resides in a corresponding recess in the unibody housing.

FIGS. 24A and 24B are two parts of an example methodology 2400 for assembling paired simplex fiber optic connectors according to one or more embodiments described herein. Initially, at step 2402, a first spring and a fist ferrule assembly are installed in a hollow barrel projection formed on a front side of a first rear body, the barrel projection comprising a groove that traverses all or part of a circumference of the barrel projection. At 2404, a first front body is installed over the barrel projection, causing the front tip of the first ferrule assembly to protrude through a front opening of the first front body. The first front body comprises at least one ridge along an inner edge or rim of a rear opening, and the at least one ridge resides in the groove of the barrel projection while the first front body is installed over the barrel projection, such that the first front body is rotatable about the barrel projection independently of the first ferrule assembly.

At 2406, the first ferrule assembly is connected to a first optical fiber inside the first rear body, the first optical fiber entering the first rear body via an opening on the rear side of the first rear body. At 2408, a first crimp sleeve is installed on a first crimp core located on the rear side of the first rear body. At 2410, a second spring, a second ferrule assembly, a second front body, and a second crimp sleeve are installed on a second rear body, and a second optical fiber is connected to the second ferrule assembly inside the second rear body.

The methodology then proceeds to step 2412 of FIG. 24B, where a left side of the first rear body is mounted to a right side of a clip such that top and bottom rails on the right side of the clip reside in corresponding grooves on the top left edge and bottom left edge of the first rear body. At 2414, a right side of the second rear housing is mounted to a left side of the clip such that top and bottom rails on the left side of the clip reside in corresponding grooves on the top right edge and bottom right edge of the second rear body.

At 2416, first and second boots are slid forward to rear walls of the first and second rear bodies, respectively. At 2418, a puller is installed on the assembly that results from implementing steps 2402-2416, the puller having at least one protrusion that resides in a corresponding groove of the clip.

FIG. 25 illustrates an example methodology 2500 for reversing the polarity of a duplexed connector or a paired simplex connector according to one or more embodiments of this disclosure. For a duplexed connector, the methodology begins at step 2502a, where a puller is removed from a top surface of the connector. At 2504a, a first front body of the duplexed connector is rotated approximately 180 degrees about a unibody housing of the duplexed connector. In one or more embodiments, the first front body may be mounted on one of two barrel projections of the unibody housing in a manner that allows the front body to be rotated about the barrel projection. At 2506a, a second front body of the duplex connector is also rotated approximately 180 degrees about the unibody housing.

For a paired simplex connector, the methodology begins at step 2502b, where a puller is removed from a top surface of the connector. At 2504b, a first front body of the paired simplex connector is rotated approximately 180 degrees about a first rear body of the paired simplex connector. At 2506b, a second front body of the paired simplex connector is also rotated approximately 180 degrees about a second rear body of the paired simplex connector. The first and second rear bodies may be connected in a parallel orientation using a duplex clip to form the paired simplex connector.

In either the duplexed connector scenario or the paired simplex connector scenario, after the two front bodies have been rotated, the methodology moves to step 2508, where the connector is flipped such that the bottom surface of the connector now faces upward, and reversed vis-à-vis the duplexing unibody housing or pairing clip compared to the starting position. At 2510, the puller is attached to the now upward-facing surface of the connector, and the polarity reversal is complete.

Figure 26B:
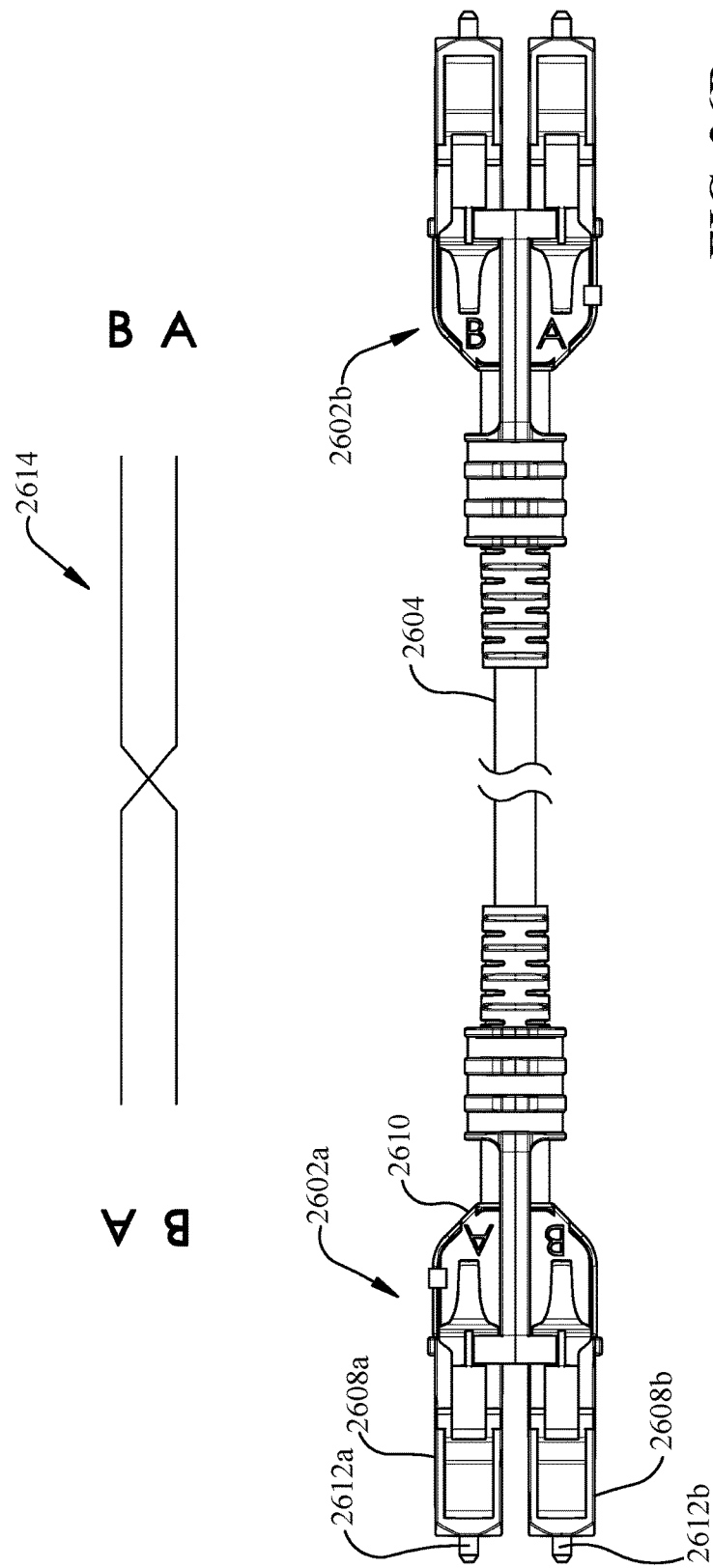
FIG. 26B is a top view of fiber optic cable terminated on both ends by a first duplex connector and a second duplex connector, in which the polarity has been reversed.

With conventional reversible duplex connectors, there is typically no way to readily visually identify whether a connected duplex connector has been reversed in polarity, or alternatively if the connector is configured for straight-through connectivity. FIG. 26A is a top view of a fiber optic cable 2604 terminated on both ends by a first duplex connector 2602a and a second duplex connector 2602b. Properties of the first duplex connector 2602a and second duplex connector 2602b are now described with reference to the first duplex connector 2602a, although it is to be understood that the second duplex connector 2602b has a similar construction. Also, although the labeling convention described herein is depicted in FIGS. 26A and 26B as being implemented on duplex connectors 2602 having a similar construction to that of the duplex fiber optic connector with unibody housing 116 described above in connection with FIGS. 1-9, it is to be appreciated that the labeling convention described herein can be implemented on substantially any type of duplex connector, as well as paired simplex fiber optic connectors such as that described above in connection with FIGS. 10-19.

Fiber optic cable 2604 includes two optical fibers (not shown) housed within the cable's jacket. Fiber optic cable 2604 enters the rear side 2610 of duplex connector 2602a, and the two optical fibers are separate within the housing of the duplex connector 2602a and terminated on respective ferrules 2612a and 2612b within the duplex connector 2602a. The ferrules 2612a and 2612b are located within respective front bodies 2608a and 2608b of the duplex connector 2602a, such that the ferrules 2612a and 2612b protrude through the front sides of the front bodies 2608a and 2608b. Plugging the duplex connector 2602a into an adapter causes an optical connection to be made between each of the ferrules 2612a and 2612b and the corresponding ferrules of the duplex connector inserted into the opposing side of the adapter, thereby optically connecting the two optical fibers of cable 2604 to the corresponding optical fibers in the cable of the mated duplex connectors.

In the illustrated example, the top side of the housing of duplex connector 2602a is marked with labels "A" and "B," each label corresponding to one of the two front bodies 2608a and 2608b. These labels are used for reference when describing the polarity of the fiber optic connection, which is a function of how the front bodies 2602a and 2602b are connected to the optical fibers of fiber optic cable 2604, or how the front bodies 2602a and 2602b are plugged into their corresponding adapters. For example, connection schematic 2606 illustrates the optical fiber connectivity between the front bodies 2608 of the connectors 2602a and 2602b. In the example illustrated in FIG. 26A, front body "A" (2608a) of duplex connector 2602a and front body "B" of duplex connector 2602b are connected to each other via one of one of the optical fibers of fiber optic cable 2604. Likewise, front body "B" (2608b) of duplex connector 2602a and front body "A" of duplex connector 2602b are connected together via the other optical fiber of fiber optic cable 2604. This results in a straight-through connection between the duplex connectors 2602a and 2602b. This type of connection is referred to as "A-B" polarity, since the "A" front body of one duplex connector is communicatively connected to the "B" front body of the other duplex connector. In general, the front body labeled "A" is assumed to be a transmit connector, while the front body labeled "B" is assumed to be a receive connector. When configured for "A-B" polarity, the receive connector (labeled "A") of one of the duplex connectors 2602 is connected to the transmit connector (labeled "B") of the other duplex connector 2602.

Some duplex connectors allow the "A-B" polarity to be reversed by reversing the positions of the two optical fibers within one of the duplex connectors 2602a or 2602b, or by inverting one of the duplex connectors 2602a or 2602b (as with the duplex connector assemblies described above in connection with FIGS. 1-9). FIG. 26B is a top view of fiber optic cable 2604 terminated on both ends by first duplex connector 2602a and second duplex connector 2602b, in which the polarity has been reversed relative to the depiction in FIG. 26A. In this example, the optical fibers of fiber optic cable 2604 have been reversed in duplex connector 2602a, such that the ferrule that previously resided in the "B" front body now resides in the "A" front body, and vice versa. This results in the crossed connectivity shown in connection schematic 2606, referred to as an "A-A" polarity, since the "A" front body of one duplex connector 2602a is connected to the "A" front body of the other duplex connector 2602b. This "A-A" polarity may be appropriate in a number of scenarios, including communication applications that utilize only one-way communication, communication applications that use wave division multiplexing to place receive and transmit signals on the same optical fiber, or serial transmission applications that allow the receive and transmit signals to travel in the same direction.

As can be seen in FIGS. 26A an 26B, there is no easy way to visually identify which polarity the connectors 2602a and 2602b are wired for, since the "A" and "B" labels do not change between the two configurations. Some duplex connectors that achieve the crossed polarity illustrated in FIG. 26B by inverting one of the duplex connectors 2602a or 2602b are able to maintain the "A" and "B" labels on the upward-facing side of the connector by placing the labels on a removable component of the connector that can be removed and relocated to the upward-facing side of the connector when inverted. However, this results in an identical labeling to that of the straight-through "A-B" polarity. Consequently, a user who is inspecting fiber optic connections on a patch panel or other connectivity environment cannot easily discern the polarity of the connection.

To address these and other issues, one or more embodiments described herein provide a duplex connector that is marked or embossed with labels that facilitate visual identification of the polarity of the connector. In one or more embodiments, one side of the duplex connector can be marked with "A" and "B" labels corresponding to the receive and transmit front bodies, respectively. On the opposite side of the duplex connector, the receive and transmit front bodies are both labeled with an "A." When the duplex connector is configured for "A-B" polarity, the side of the duplex connector marked or embossed with the "A" and "B" labels is arranged to face upward while the duplex connector is plugged into an adapter (e.g., an adapter of a patch panel or other device), rendering those labels visible. When the duplex connector is reconfigured for "A-A" polarity, the opposite side marked with the two "A" labels is oriented to face upward, rendering those labels visible. Thus, a user can readily identify whether the connector is configured for "A-B" polarity or "A-A" polarity.

These identification features are suitable for substantially any type of duplex connector (including fiber optic connectors coupled by means of a unibody housing or duplex clip, duplex connectors for copper data connections, or connectors for other types of data communication connections). Presently, the identification features are described herein in connection with the duplex fiber optic connector with unibody housing 116 described above in connection with FIGS. 1-9.

Figure 27A:
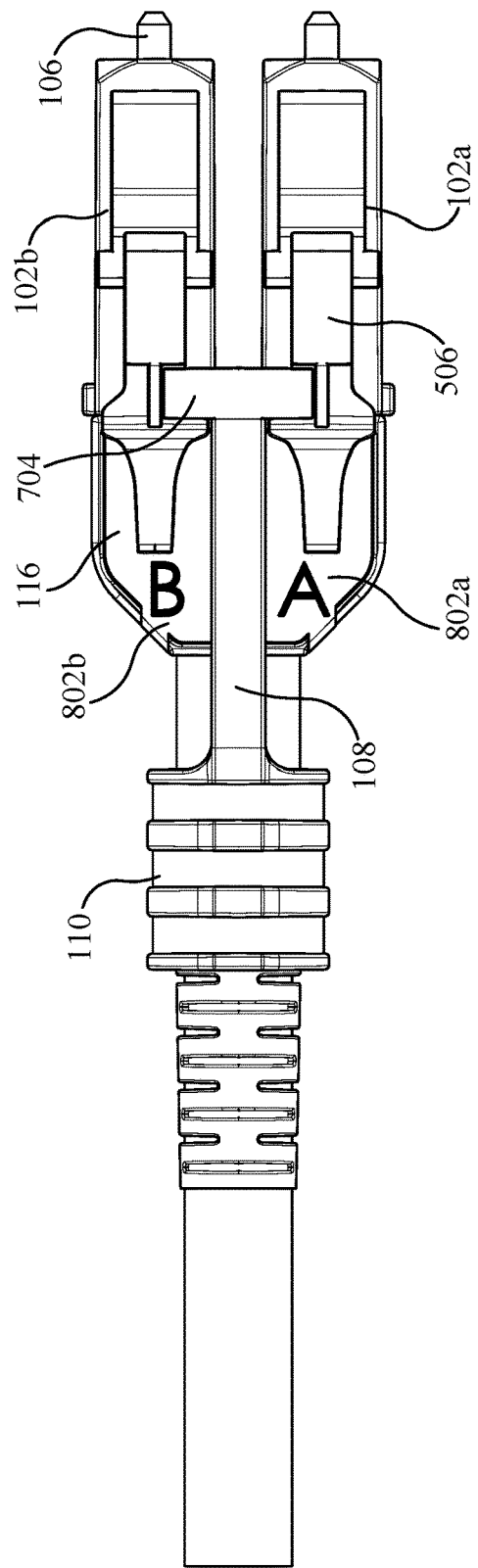
FIG. 27A is a top view of an assembled duplex fiber optic connector when configured for straight-through "A-B" polarity.
Figure 27B:
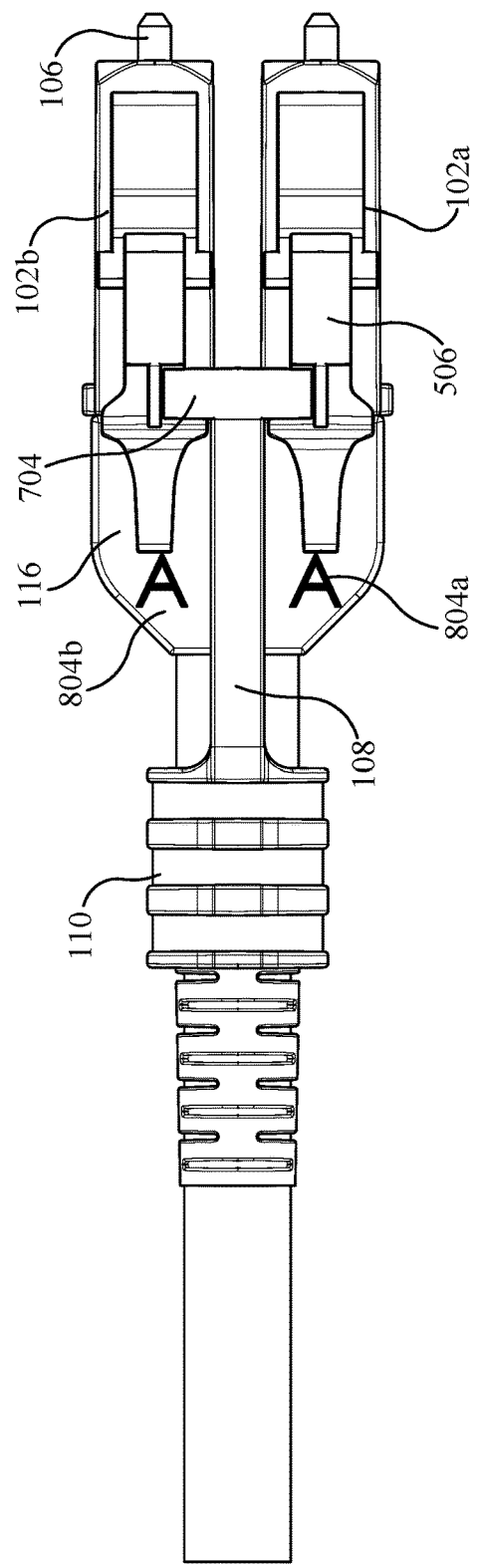
FIG. 27B is a top view of an assembled duplex fiber optic connector when configured for crossed "A-A" polarity.

FIG. 27A is a top view of the assembled duplex fiber optic connector with unibody housing 116 when configured for straight-through "A-B" polarity. As can be seen, the upward-facing side of the unibody housing 116 is marked with identification markings 802a and 802b. FIG. 27B is a top view of the assembled duplex fiber optic connector when configured for crossed "A-A" polarity. When configured for "A-A" polarity, the duplex fiber optic unibody housing 116 is inverted, such that the top side of the connector in FIG. 27A becomes the bottoms side in FIG. 27B, and the bottom side in FIG. 27A becomes the top, or upward-facing, side in FIG. 27B. As can be seen in FIG. 27B, the reverse side of the unibody housing 116 is marked with identification markings 804a and 804b, which are different than the identification markings 802a and 802b. Identification markings 802a/802b and 804a/804b distinguish between the top side and bottom side of the unibody housing 116, allowing users to easily identify the polarity of the duplex patch cable terminated to the duplex fiber optic connectors.

In one or more embodiments, the identification markings 802a/802b and 804a/804b are chosen to correspond to the accepted industry nomenclature used to describe duplex patch cord polarities. In particular, identification markings 802a/802b, which are visible on the upward-facing side of the connector when configured for "A-B" polarity, comprise an "A" label and a "B" label. Identification markings 804a/804b, which are visible on the upward-facing side of the connector when configured for "A-A" polarity comprise two "A" labels. Identification markings 802a/802b can be embossed, stamped, printed, or otherwise marked on the unibody housing 116 or on individual connector housings for duplex connectors not disposed in a unibody housing 116.

Figure 28A:
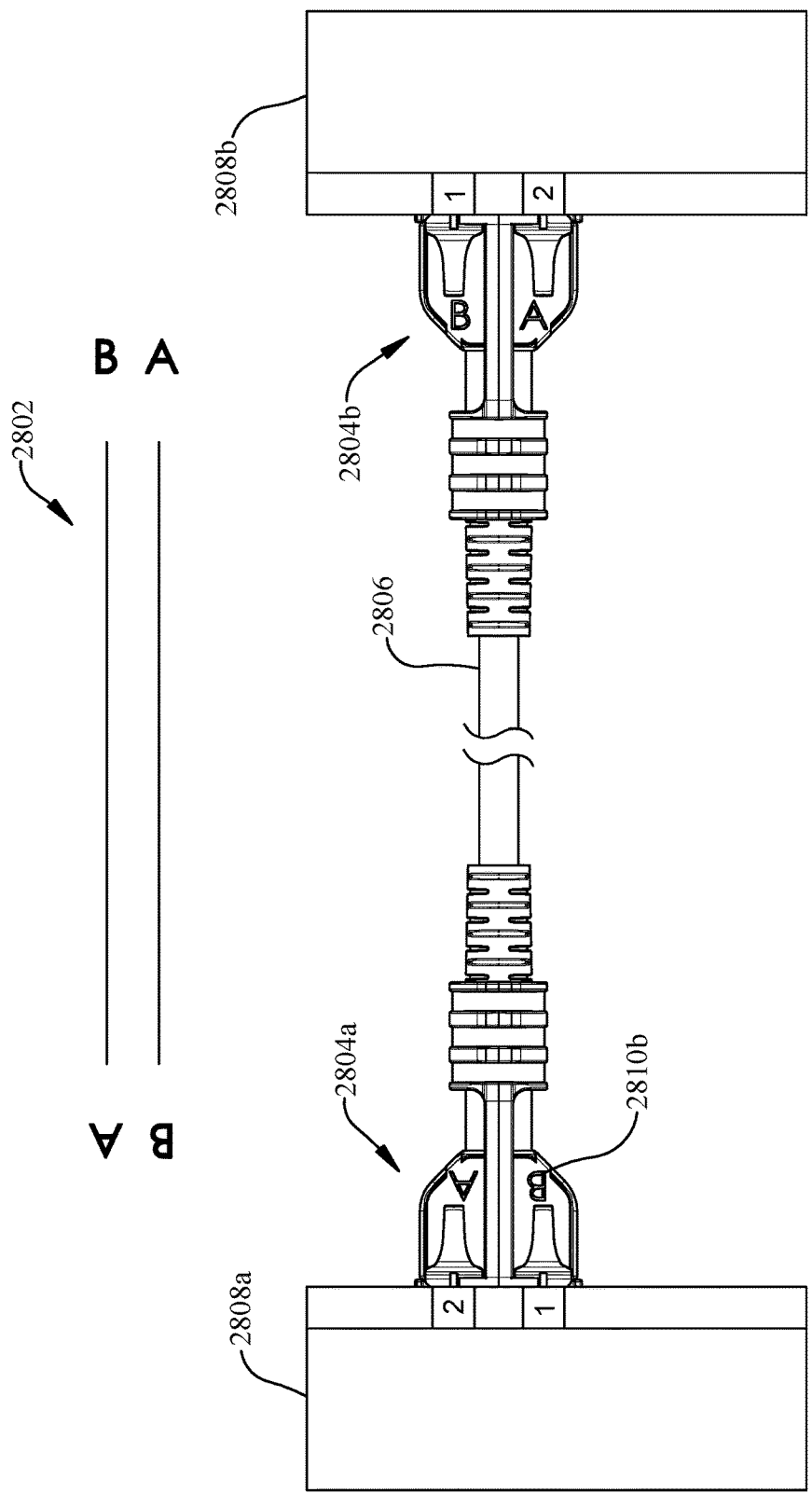
FIG. 28A is a diagram of a data connection configured for straight-through, or "A-B," polarity.
Figure 28B:
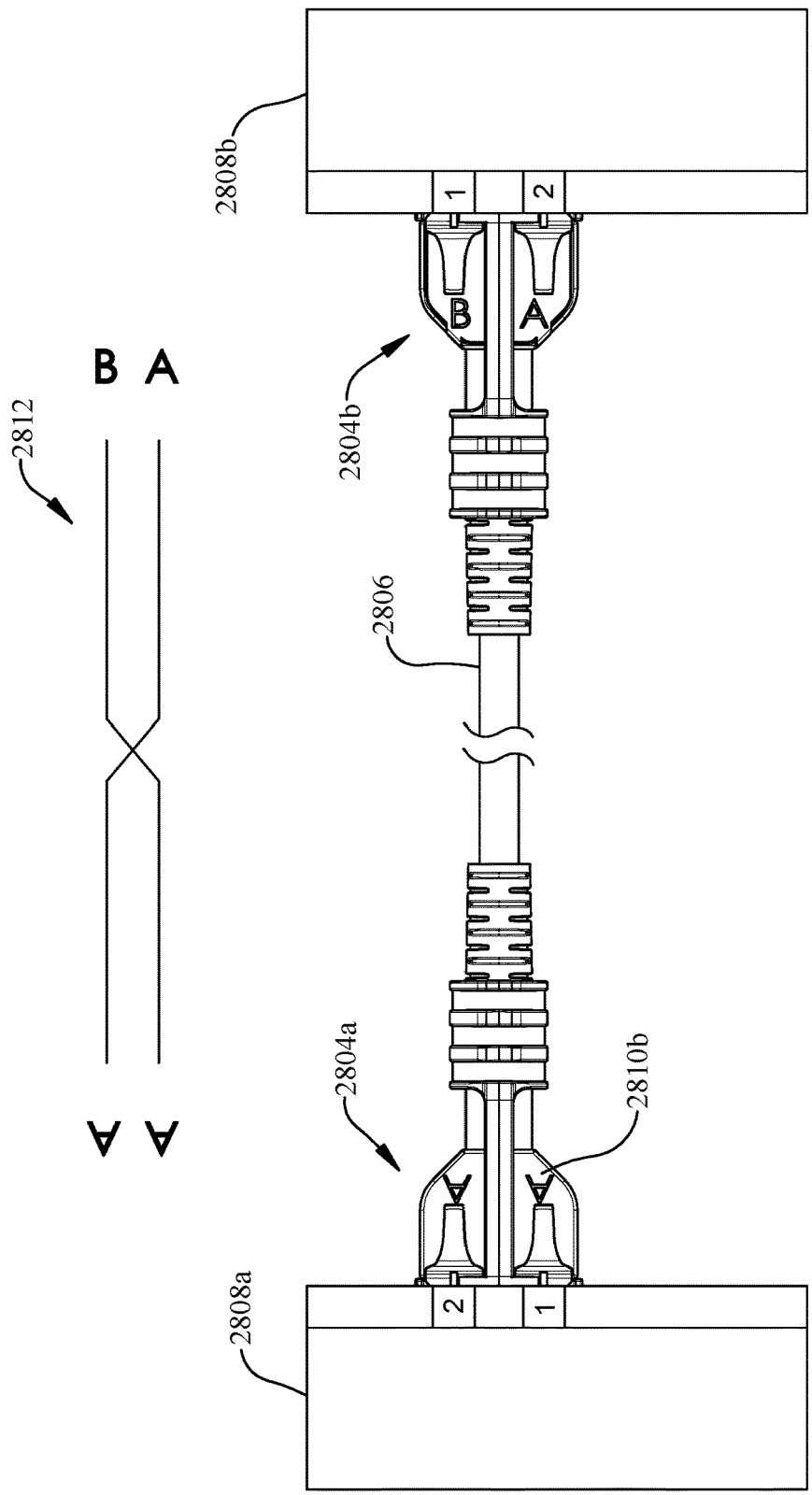
FIG. 28B is a diagram of the data connection after a polarity reversal has been performed on the first duplex LC connector, resulting in a crossed, or "A-A" polarity.

FIGS. 28A and 28B illustrate the simplified polarity identification facilitated by the marking system described herein. FIG. 28A is a diagram of a data connection configured for straight-through, or "A-B," polarity. In this example, a fiber optic patch cable 2806 is terminated on a first end by a first duplex fiber optic connector 2804a, and on a second end by a second duplex fiber optic connector 2804b. First duplex fiber optic connector 2804a is plugged into a fiber optic adapter of a first device 2808a, which may be a fiber optic patch panel or another device. Similarly, second duplex fiber optic connector 2804b is plugged into a fiber optic adapter of a second device 2808b (e.g. another patch panel or another type of device). As illustrated by the connection diagram 2802, fiber optic patch cable 2806 is configured for "A-B" polarity, such that the terminal 2 of first device 2808a is connected to terminal 1 of second device 2808b. In this scenario, a user inspecting the data connection at device 2808a would see that the identification markings 2810a visible on the upward-facing side of first duplexed. LC connector 2804a are "B" and "A," indicating a straight-through "A-B" polarity.

FIG. 28B is a diagram of the data connection after a polarity reversal has been performed on the first duplex fiber optic connector 2804a, resulting in a crossed, or "A-A" polarity. When the polarity identification system is used for the particular example duplex fiber optic connectors described herein, the polarity of duplex fiber optic connector 2804a can be reversed using the technique described above in connection with FIGS. 20A-20F (however, the polarity identification system described herein is suitable for any type of duplex connector Whose polarity can be reversed by inverting the connector). Since reversing the polarity involves inverting the first duplex fiber optic connector 2804a, the identification markings 2810b, which were previously on the downward-facing side of the first duplex fiber optic connector 2804a, are now on the upward-facing side. Rather than being labeled "A" and "B," or "B" and "A," identification markings 2810b are labeled "A" and "A." As shown by the connection diagram 2812, this polarity configuration causes terminal of first device 2808a to be connected to terminal 2 of second device 2808b.

Labeling the reverse side of first duplex fiber optic connector 2804a with two "A" markings rather than simply reversing the positions of the "A" and "B" labels relative to its opposite side (or leaving the reverse side blank) can help a user to readily identify the polarity of the patch cable 2806. For example, when a user at the first device 2808*a* is inspecting first duplex fiber optic connector 2804*a*, the two "A" markings visible on the upward-facing side immediately identify the polarity as "A-A." This eliminates the need for the user to understand what the relative positions of the "A" and "B" labels convey about the polarity of the patch cable. Moreover, using two "A" markings to indicate "A-A" polarity conforms to the accepted nomenclature for crossed polarity connections.

Figure 29:
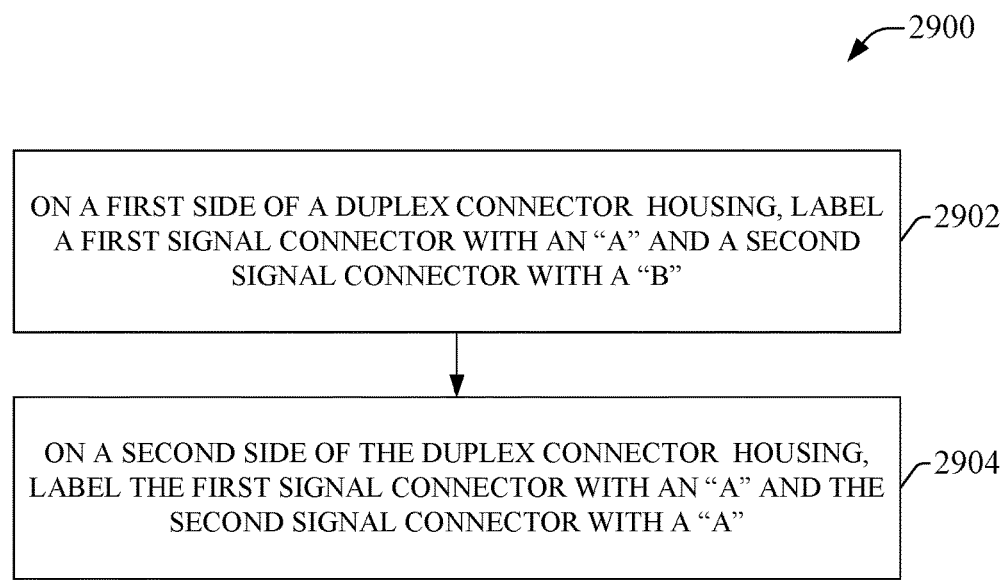
FIG. 29 is a flowchart of an example methodology for marking a duplex connector for polarity identification.

FIG. 29 illustrates a methodology in accordance with one or more embodiments of the subject application. While, for purposes of simplicity of explanation, the methodology shown herein is described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 29 illustrates an example methodology 2900 for marking a duplex connector for polarity identification. Methodology 2900 can be implemented on substantially any type of duplex connector whose polarity can be reversed by inverting the connection, including but not limited to fiber optic duplex connectors or duplex connectors for copper data connections.

Initially, at 2902, on a first side of a duplex connector housing, a first signal connector of the housing is labeled with an "A" and a second signal connector of the housing is labeled with a "B." At 2904, on the second side of the duplex connector housing, the first signal connector of the housing is labeled with an "A" and the second signal connector of the housing is also labeled with an "A".

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A duplex connector, comprising:
   a first connector configured to plug into a first adapter; and
   a second connector configured to plug into a second adapter;
   wherein
   the first connector and the second connector comprise respective first sides and respective second sides that are opposite the first sides,
   while the first connector and the second connector are plugged into the first adapter and the second adapter according to a first polarity, the first sides are upward-facing,
   while the first connector and the second connector are plugged into the first adapter and the second adapter according to a second polarity, the second sides are upward-facing,
   the first side of the first connector is labeled with a first identifier,
   the first side of the second connector is labeled with a second identifier,
   the second side of the first connector is labeled with the first identifier, and
   the second side of the second connector is labeled with the first identifier.

2. The duplex connector of claim 1, wherein the first identifier is an "A" and the second identifier is a "B".

3. The duplex connector of claim 1, wherein the first polarity is a straight-through polarity, and the second polarity is a crossed polarity.

4. The duplex connector of claim 1, wherein the duplex connector is a fiber optic connector.

5. The duplex connector of claim 1, wherein the first connector and the second connector comprise a first barrel projection and a second barrel projection, respectively, and wherein the first barrel projection and the second barrel projection are hollow and are configured to receive respective springs and ferrule assembles via front ends of the first barrel projection and the second barrel projection.

6. The duplex connector of claim 5, wherein the first fiber connector and the second fiber connector further comprise a first front body and a second front body, respectively, that fit over the first barrel projection and the second barrel projection while the springs and the ferrule assemblies are in the first and second barrel projections, and wherein the first front body and the second front body comprise respective rear openings that receive the first barrel projection and the second barrel projection, respectively.

7. The duplex connector of claim 6, wherein
the first barrel projection and the second barrel projection comprise respective grooves at or near bases of the first barrel projection and the second barrel projection, and
rims formed on the rear openings comprise ridges configured to be received by the grooves of the first barrel projection and the second barrel projection while the first front body and the second front body are attached to the first barrel projection and the second barrel projection.

8. The duplex connector of claim 5, wherein inner surfaces of the first barrel projection and the second barrel projection comprise geometric profiles conforming to a shape of ferrule holders of the ferrule assemblies.

9. A cable assembly, comprising:
a cable comprising at least two conductors; and
a duplex connector attached to an end of the cable, wherein the duplex connector comprises:
a transmit connector communicatively connected to a first conductor of the at least two conductors, and
a receive connector communicatively connected to a second conductor of the at least two conductors,
wherein
while the duplex connector is plugged into an adapter according to a first polarity, first sides of the transmit connector and the receive connector are upward-facing,
while the duplex connector is plugged into the adapter according to a second polarity, second sides of the connector housing are upward-facing,
the first side of the transmit connector comprises a transmit identifier marking,
the first side of the receive connector comprises a receive identifier marking,
the second side of the transmit connector comprises the receive identifier marking, and
the second side of the transmit connector comprises the receive identifier marking.

10. The cable assembly of claim 9, wherein the transmit identifier marking comprises a letter "B" and the receive identifier marking comprises a letter "A".

11. The cable assembly of claim 9, wherein the transmit identifier marking and the receive identifier marking are at least one of printed, stamped, or embossed on the connector housing.

12. The cable assembly of claim 9, wherein the first polarity is a straight-through polarity, and the second polarity is a crossed polarity.

13. The cable assembly of claim 9, wherein the at least two conductors are optical fibers.

14. The cable assembly of claim 9, wherein the at least two conductors are copper conductors.

15. The cable assembly of claim 9, wherein
the transmit connector and the receive connector comprise a first barrel projection and a second barrel projection, respectively,
the first barrel projection and the second barrel projection are hollow and are configured to receive respective springs and ferrule assembles via front ends of the first barrel projection and the second barrel projection, and
the first conductor and the second conductor are connected to the ferrule assemblies.

16. The cable assembly of claim 15, wherein the transmit connector and the receive connector further comprise a first front body and a second front body, respectively, that fit over the first barrel projection and the second barrel projection while the springs and the ferrule assemblies are in the first and second barrel projections, and wherein the first front body and the second front body comprise respective rear openings that receive the first barrel projection and the second barrel projection, respectively.

17. The cable assembly of claim 16, wherein
the first barrel projection and the second barrel projection comprise respective grooves at or near bases of the first barrel projection and the second barrel projection, and
rims formed on the rear openings comprise ridges configured to be received by the grooves of the first barrel projection and the second barrel projection while the first front body and the second front body are attached to the first barrel projection and the second barrel projection.

18. A method, comprising:
rotating a first front body of a duplex connector about a first barrel projection on which the first front body is attached, wherein the first front body and the first barrel projection house a first ferrule assembly comprising a first ferrule that protrudes from a first front opening of the first front body, wherein a first side of the duplex connector contains a first identifying mark in association with the first front body, and wherein a second side of the duplex connector contains a second identifying mark in association with the first front body;
rotating a second front body of the fiber optic connector about a second barrel projection on which the second front body is attached, wherein the second front body and the second barrel projection house a second ferrule assembly comprising a second ferrule that protrudes from a second front opening of the second front body, wherein the first side of the duplex connector contains a second identifying mark in association with the second front body, and wherein the second side of the duplex connector contains the first identifying mark in association with the second front body;
removing a puller from a first side of the fiber optic connector; and
attaching the puller to a second side of the fiber optic connector opposite the first side.

19. The method of claim 18, further comprising:
attaching the duplex connector to an end of a cable comprising two or more conductors;
connecting a first conductor of the two or more conductors to the first ferrule assembly within the duplex connector; and
connecting a second conductor of the two or more conductors to the second ferrule assembly within the duplex connector.

20. The method of claim 19, further comprising inverting the duplex connector to facilitate reversing a polarity of the cable.

* * * * *